United States Patent
Nicolaides et al.

(12) 
(10) Patent No.: US 12,516,096 B2
(45) Date of Patent: Jan. 6, 2026

(54) COMPOSITION AND USE OF HUMORAL IMMUNE SUPPRESSOR ANTAGONISTS FOR THE TREATMENT OF HUMORAL IMMUNE SUPPRESSED DISEASES

(71) Applicant: Navrogen, Inc., Glen Mills, PA (US)

(72) Inventors: Nicholas C. Nicolaides, Glen Mills, PA (US); Luigi Grasso, Bryn Mawr, PA (US); James Bradford Kline, Morgantown, PA (US)

(73) Assignee: Navrogen, Inc., Glen Mills, PA (US)

( * ) Notice: Subject to any disclaimer, the term of this patent is extended or adjusted under 35 U.S.C. 154(b) by 1474 days.

(21) Appl. No.: 16/984,444

(22) Filed: Aug. 4, 2020

(65) Prior Publication Data

US 2021/0040174 A1  Feb. 11, 2021

Related U.S. Application Data

(60) Provisional application No. 62/884,246, filed on Aug. 8, 2019.

(51) Int. Cl.
| | |
|---|---|
| C07K 14/705 | (2006.01) |
| A61K 9/127 | (2025.01) |
| A61K 39/00 | (2006.01) |
| A61K 47/60 | (2017.01) |
| C07K 14/765 | (2006.01) |
| C07K 16/00 | (2006.01) |
| G01N 33/574 | (2006.01) |

(52) U.S. Cl.
CPC ............ *C07K 14/705* (2013.01); *A61K 9/127* (2013.01); *A61K 39/001102* (2018.08); *A61K 47/60* (2017.08); *C07K 14/70578* (2013.01); *C07K 14/765* (2013.01); *C07K 16/00* (2013.01); *G01N 33/57492* (2013.01); *A61K 2039/572* (2013.01); *A61K 2039/575* (2013.01); *C07K 2317/51* (2013.01); *C07K 2319/31* (2013.01)

(58) Field of Classification Search
CPC ............ C07K 2319/31; C07K 2319/00; C07K 14/705; A61K 47/68
See application file for complete search history.

(56) References Cited

U.S. PATENT DOCUMENTS

| 8,623,828 B2 | 1/2014 | Ho et al. |
| 2007/0092940 A1 | 4/2007 | Eigenbrot et al. |

FOREIGN PATENT DOCUMENTS

| JP | 2002119286 A | 4/2002 | |
| WO | WO-2010065044 A1 * | 6/2010 | ............ A61P 37/04 |
| WO | 2015/095895 A1 | 6/2015 | |
| WO | 2017/040344 A2 | 3/2017 | |
| WO | 2018056351 A1 | 3/2018 | |
| WO | 2018/144955 A1 | 8/2018 | |

OTHER PUBLICATIONS

Bowie et al. (Science, 1990, 247:1306-1310) (Year: 1990).*
Burgess et al. (J. Cell Biol. 111:2129-2138, 1990 (Year: 1990).*
Lazar et al. (Mol. Cell. Biol., 8:1247-1252, 1988) (Year: 1988).*
Whisstock et al. (Quarterly Reviews in Biophysics. 36(3):307-340, 2007 (Year: 2007).*
Jazayeri et al. Biodrugs 2008; 22 (1): 11-26). (Year: 2008).*
Nov. 19, 2020—(WO) International Search Report & Written Opinion—App. No. PCT/US2020/045245.
Das et al. "Understanding the Unique Attributes of MUC16 (CA125): Potential Implications in Targeted Therapy" Cancer Research; vol. 75; No. 22; Nov. 15, 2015; pp. 4669-4674.
Jul. 4, 2023—(EP) Extended European Search Report—Appl No. 20851048.7.
Li et al. "Tandem repeats of Sushi3 peptide with enhanced LPS-binding and -neutralizing activities" Protein Engineering; vol. 16; No. 8; 2003; pp. 629-635.
Xiang et al. "HN125: A Novel Immunoadhesin Targeting MUC16 with Potential for Cancer Therapy" Journal of Cancer; May 16, 2011; 2; pp. 280-291.
Feb. 24, 2023—(JP) Notice of Reasons for Rejection—Appl No. 2022-507590.

* cited by examiner

*Primary Examiner* — Vanessa L. Ford
*Assistant Examiner* — Sandra Carter
(74) *Attorney, Agent, or Firm* — Banner & Witcoff, Ltd.

(57) ABSTRACT

The CA125/MUC16 protein has been found to be a suppressor of humoral immunity, in particularly antibody-mediated humoral immunity. The generation of antagonists that can block its immune suppressive effects on antibodies may lead to enhanced therapeutic responses by antibodies that are negatively impacted by CA125/MUC16. In addition, it offers the ability to unlock humoral immune suppression of a patient's endogenous humoral response that may be suppressed by CA125/MUC16 suppression. CA125/MUC16 antagonists can be used to enhance humoral response of therapeutic antibodies and patients with CA125/MUC16-expressing diseases, including cancer.

17 Claims, 8 Drawing Sheets

Specification includes a Sequence Listing.

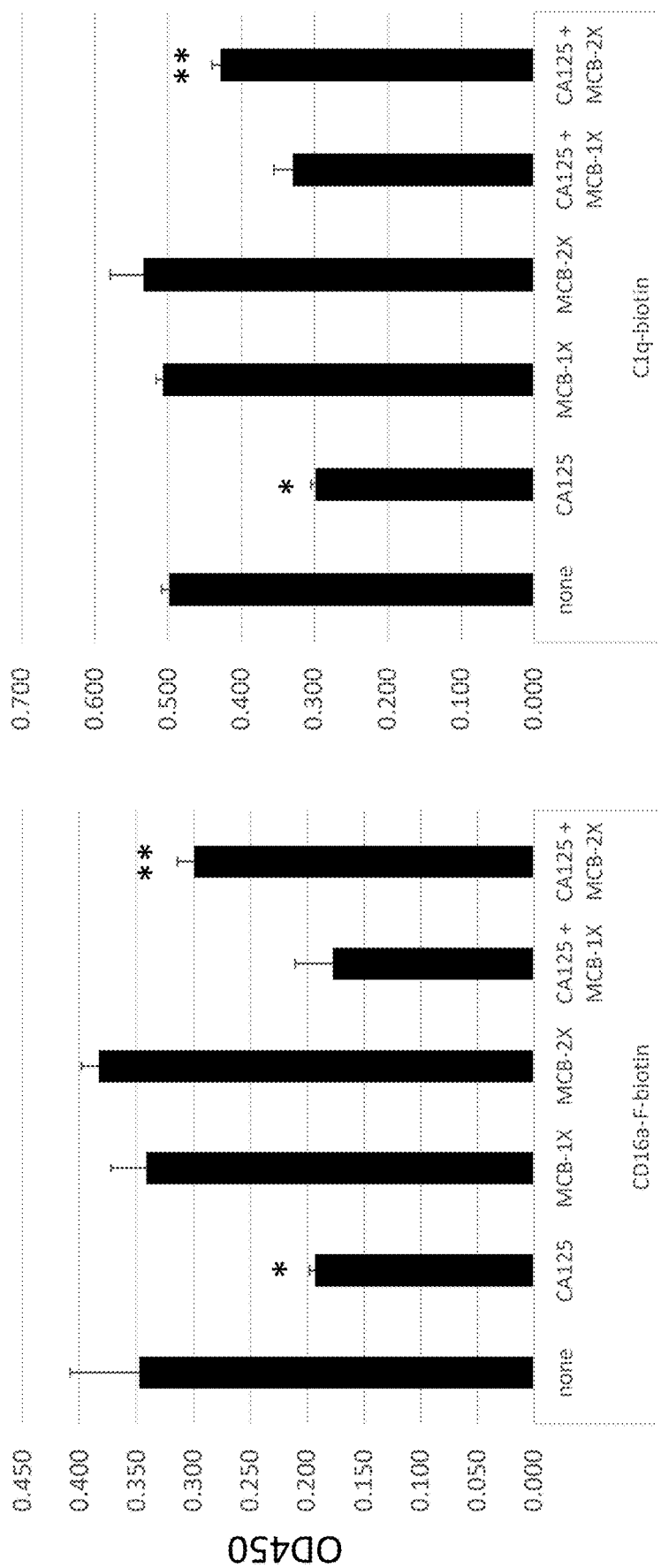

Fig. 8 SEQ IDs:

SEQUENCE IDENTIFICATION (all sequences N to C terminal)

UPPERCASE denotes leader sequence
*lowercase italic* denotes MCB minimal domain
UPPERCASE UNDERLINE BOLD denotes spacer
UPPERCASE BOLD denotes human Fc heavy chain domain
lowercase underline bold denotes disulfide bridge moiety in Fc domain

SEQ ID NO: 1

*evektacpsgkkareideslifykkweleacvdaallatqmdrvnaipftyeqldvlkhkldel*

SEQ ID NO: 2

MGWSCIILFLVATATGVHS*evektacpsgkkareideslifykkweleacvdaallatqmdrvnaipftyeqldvlkhkldel*EPKSCDKTHTcpcPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK

SEQ ID NO: 3

MGWSCIILFLVATATGVHS*evektacpsgkkareideslifykkweleacvdaallatqmdrvnaipftyeqldvlkhkldel*GGGG*Sevektacpsgkkareideslifykkweleacvdaallatqmdrvnaipftyeqldvlkhkldel*GGGGcpcPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK

SEQ ID NO: 4

MGWSCIILFLVATATGVHS*evektacpsgkkareideslifykkweleacvdaallatqmdrvnaipftyeqldvlkhkldel*EPKSCDKTHTcpcPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK

SEQUENCE LISTING

<160> NUMBER OF SEQ ID NOS: 15

<210> SEQ ID NO 1
<211> LENGTH: 64
<212> TYPE: PRT
<213> ORGANISM: Homo sapiens

<400> SEQUENCE: 1

Glu Val Glu Lys Thr Ala Cys Pro Ser Gly Lys Lys Ala Arg Glu Ile
1               5                   10                  15

Asp Glu Ser Leu Ile Phe Tyr Lys Lys Trp Glu Leu Glu Ala Cys Val
            20                  25                  30

Asp Ala Ala Leu Leu Ala Thr Gln Met Asp Arg Val Asn Ala Ile Pro
            35                  40                  45

Phe Thr Tyr Glu Gln Leu Asp Val Leu Lys His Lys Leu Asp Glu Leu
 50                  55                  60

<210> SEQ ID NO 2
<211> LENGTH: 384
<212> TYPE: PRT
<213> ORGANISM: Homo sapiens

<400> SEQUENCE: 2

Met Gly Trp Ser Cys Ile Ile Leu Phe Leu Val Ala Thr Ala Thr Gly
 1               5                  10                  15

Val His Ser Glu Val Glu Lys Thr Ala Cys Pro Ser Gly Lys Lys Ala
            20                  25                  30

Arg Glu Ile Asp Glu Ser Leu Ile Phe Tyr Lys Lys Trp Glu Leu Glu
        35                  40                  45

Ala Cys Val Asp Ala Ala Leu Leu Ala Thr Gln Met Asp Arg Val Asn
    50                  55                  60

Ala Ile Pro Phe Thr Tyr Glu Gln Leu Asp Val Leu Lys His Lys Leu
65                  70                  75                  80

Asp Glu Leu Gly Gly Gly Ser Glu Val Glu Lys Thr Ala Cys Pro
                85                  90                  95

Ser Gly Lys Lys Ala Arg Glu Ile Asp Glu Ser Leu Ile Phe Tyr Lys
                100                 105                 110

Lys Trp Glu Leu Glu Ala Cys Val Asp Ala Ala Leu Leu Ala Thr Gln
            115                 120                 125

Met Asp Arg Val Asn Ala Ile Pro Phe Thr Tyr Glu Gln Leu Asp Val
        130                 135                 140

Leu Lys His Lys Leu Asp Glu Leu Glu Pro Lys Ser Cys Asp Lys Thr
145                 150                 155                 160

His Thr Cys Pro Pro Cys Pro Ala Pro Glu Leu Leu Gly Gly Pro Ser
                165                 170                 175

Val Phe Leu Phe Pro Pro Lys Pro Lys Asp Thr Leu Met Ile Ser Arg
                180                 185                 190

Thr Pro Glu Val Thr Cys Val Val Val Asp Val Ser His Glu Asp Pro
            195                 200                 205

Glu Val Lys Phe Asn Trp Tyr Val Asp Gly Val Glu Val His Asn Ala
        210                 215                 220

Lys Thr Lys Pro Arg Glu Glu Gln Tyr Asn Ser Thr Tyr Arg Val Val
225                 230                 235                 240

Ser Val Leu Thr Val Leu His Gln Asp Trp Leu Asn Gly Lys Glu Tyr
                245                 250                 255

Lys Cys Lys Val Ser Asn Lys Ala Leu Pro Ala Pro Ile Glu Lys Thr
                260                 265                 270

Ile Ser Lys Ala Lys Gly Gln Pro Arg Glu Pro Gln Val Tyr Thr Leu
            275                 280                 285

Pro Pro Ser Arg Asp Glu Leu Thr Lys Asn Gln Val Ser Leu Thr Cys
        290                 295                 300

Leu Val Lys Gly Phe Tyr Pro Ser Asp Ile Ala Val Glu Trp Glu Ser
305                 310                 315                 320

Asn Gly Gln Pro Glu Asn Asn Tyr Lys Thr Thr Pro Val Leu Asp
                325                 330                 335

Ser Asp Gly Ser Phe Phe Leu Tyr Ser Lys Leu Thr Val Asp Lys Ser
                340                 345                 350

Arg Trp Gln Gln Gly Asn Val Phe Ser Cys Ser Val Met His Glu Ala
            355                 360                 365

Leu His Asn His Tyr Thr Gln Lys Ser Leu Ser Leu Ser Pro Gly Lys
    370                 375                 380

<210> SEQ ID NO 3
<211> LENGTH: 453
<212> TYPE: PRT
<213> ORGANISM: Homo sapiens

<400> SEQUENCE: 3

Met Gly Trp Ser Cys Ile Ile Leu Phe Leu Val Ala Thr Ala Thr Gly
1               5                   10                  15

Val His Ser Glu Val Glu Lys Thr Ala Cys Pro Ser Gly Lys Lys Ala
            20                  25                  30

Arg Glu Ile Asp Glu Ser Leu Ile Phe Tyr Lys Lys Trp Glu Leu Glu
        35                  40                  45

Ala Cys Val Asp Ala Ala Leu Leu Ala Thr Gln Met Asp Arg Val Asn
    50                  55                  60

Ala Ile Pro Phe Thr Tyr Glu Gln Leu Asp Val Leu Lys His Lys Leu
65                  70                  75                  80

Asp Glu Leu Gly Gly Gly Gly Ser Glu Val Glu Lys Thr Ala Cys Pro
                85                  90                  95

Ser Gly Lys Lys Ala Arg Glu Ile Asp Glu Ser Leu Ile Phe Tyr Lys
            100                 105                 110

Lys Trp Glu Leu Glu Ala Cys Val Asp Ala Ala Leu Leu Ala Thr Gln
        115                 120                 125

Met Asp Arg Val Asn Ala Ile Pro Phe Thr Tyr Glu Gln Leu Asp Val
    130                 135                 140

Leu Lys His Lys Leu Asp Glu Leu Gly Gly Gly Gly Ser Glu Val Glu
145                 150                 155                 160

Lys Thr Ala Cys Pro Ser Gly Lys Lys Ala Arg Glu Ile Asp Glu Ser
                165                 170                 175

Leu Ile Phe Tyr Lys Lys Trp Glu Leu Glu Ala Cys Val Asp Ala Ala
            180                 185                 190

Leu Leu Ala Thr Gln Met Asp Arg Val Asn Ala Ile Pro Phe Thr Tyr
        195                 200                 205

Glu Gln Leu Asp Val Leu Lys His Lys Leu Asp Glu Leu Glu Pro Lys
    210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro

```
                        340                 345                 350
Gln Val Tyr Thr Leu Pro Pro Ser Arg Asp Glu Leu Thr Lys Asn Gln
            355                 360                 365

Val Ser Leu Thr Cys Leu Val Lys Gly Phe Tyr Pro Ser Asp Ile Ala
        370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly Lys
    450

<210> SEQ ID NO 4
<211> LENGTH: 315
<212> TYPE: PRT
<213> ORGANISM: Homo sapiens

<400> SEQUENCE: 4

Met Gly Trp Ser Cys Ile Ile Leu Phe Leu Val Ala Thr Ala Thr Gly
1               5                   10                  15

Val His Ser Glu Val Glu Lys Thr Ala Cys Pro Ser Gly Lys Lys Ala
            20                  25                  30

Arg Glu Ile Asp Glu Ser Leu Ile Phe Tyr Lys Lys Trp Glu Leu Glu
        35                  40                  45

Ala Cys Val Asp Ala Ala Leu Leu Ala Thr Gln Met Asp Arg Val Asn
    50                  55                  60

Ala Ile Pro Phe Thr Tyr Glu Gln Leu Asp Val Leu Lys His Lys Leu
65                  70                  75                  80

Asp Glu Leu Glu Pro Lys Ser Cys Asp Lys Thr His Thr Cys Pro Pro
                85                  90                  95

Cys Pro Ala Pro Glu Leu Leu Gly Gly Pro Ser Val Phe Leu Phe Pro
            100                 105                 110

Pro Lys Pro Lys Asp Thr Leu Met Ile Ser Arg Thr Pro Glu Val Thr
        115                 120                 125

Cys Val Val Val Asp Val Ser His Glu Asp Pro Glu Val Lys Phe Asn
    130                 135                 140

Trp Tyr Val Asp Gly Val Glu Val His Asn Ala Lys Thr Lys Pro Arg
145                 150                 155                 160

Glu Glu Gln Tyr Asn Ser Thr Tyr Arg Val Val Ser Val Leu Thr Val
                165                 170                 175

Leu His Gln Asp Trp Leu Asn Gly Lys Glu Tyr Lys Cys Lys Val Ser
            180                 185                 190

Asn Lys Ala Leu Pro Ala Pro Ile Glu Lys Thr Ile Ser Lys Ala Lys
        195                 200                 205

Gly Gln Pro Arg Glu Pro Gln Val Tyr Thr Leu Pro Pro Ser Arg Asp
    210                 215                 220

Glu Leu Thr Lys Asn Gln Val Ser Leu Thr Cys Leu Val Lys Gly Phe
225                 230                 235                 240

Tyr Pro Ser Asp Ile Ala Val Glu Trp Glu Ser Asn Gly Gln Pro Glu
                245                 250                 255
```

```
Asn Asn Tyr Lys Thr Thr Pro Pro Val Leu Asp Ser Asp Gly Ser Phe
            260                 265                 270

Phe Leu Tyr Ser Lys Leu Thr Val Asp Lys Ser Arg Trp Gln Gln Gly
            275                 280                 285

Asn Val Phe Ser Cys Ser Val Met His Glu Ala Leu His Asn His Tyr
            290                 295                 300

Thr Gln Lys Ser Leu Ser Leu Ser Pro Gly Lys
305                 310                 315

<210> SEQ ID NO 5
<211> LENGTH: 8
<212> TYPE: PRT
<213> ORGANISM: Homo sapiens

<400> SEQUENCE: 5

Gly Tyr Thr Phe Thr Ser Tyr Asn
1               5

<210> SEQ ID NO 6
<211> LENGTH: 8
<212> TYPE: PRT
<213> ORGANISM: Homo sapiens

<400> SEQUENCE: 6

Ile Tyr Pro Gly Asn Gly Asp Thr
1               5

<210> SEQ ID NO 7
<211> LENGTH: 14
<212> TYPE: PRT
<213> ORGANISM: Homo sapiens

<400> SEQUENCE: 7

Ala Arg Ser Thr Tyr Tyr Gly Gly Asp Trp Tyr Phe Asn Val
1               5                   10

<210> SEQ ID NO 8
<211> LENGTH: 6
<212> TYPE: PRT
<213> ORGANISM: Homo sapiens

<400> SEQUENCE: 8

Ser Ser Ser Val Ser Tyr
1               5

<210> SEQ ID NO 9
<211> LENGTH: 3
<212> TYPE: PRT
<213> ORGANISM: Homo sapiens

<400> SEQUENCE: 9

Ala Thr Ser
1

<210> SEQ ID NO 10
<211> LENGTH: 9
<212> TYPE: PRT
<213> ORGANISM: Homo sapiens

<400> SEQUENCE: 10

Gln Gln Trp Thr Ser Asn Pro Pro Thr
1               5
```

<210> SEQ ID NO 11
<211> LENGTH: 1155
<212> TYPE: DNA
<213> ORGANISM: Homo sapiens

<400> SEQUENCE: 11

```
atggggtggt catgtatcat cttgtttctc gtggccaccg cgactggcgt gcattcagag      60
gtggagaaga ccgcctgtcc gagcgggaaa aaggctcgcg agattgatga gtcactgatt     120
ttctacaaaa agtgggaact cgaggcttgc gtagatgcag ctcttctggc tactcaaatg     180
gacagagtaa atgctattcc ttttacttat gaacaattgg acgtattgaa acacaagctg     240
gatgaattgg gaggcggggg gtccgaggtc gagaagacgg cctgtccctc tggaaaaaaa     300
gcaagggaaa ttgacgagag tttgattttc tataagaaat gggagctcga agcatgtgta     360
gatgccgcac tgttggcaac tcaaatggat agggtgaacg caattccctt cacatatgaa     420
caactggatg tacttaagca taagttggac gaattggaac gaaatcttg tgacaaaacg      480
catacatgtc cgccgtgccc ggcccccgag ctgctgggg gtcctagtgt ctttctcttt      540
ccacctaagc ctaaggatac tctcatgatc tctcgcacac ccgaggtgac atgcgtagtc     600
gtggatgtca gccacgagga tccggaagtt aagtttaact ggtacgtcga cggagttgag     660
gtacacaatg cgaaaacaaa accacgcgag gaacagtata attccacgta ccgagtcgtt     720
tctgttctta cagtgttgca tcaggactgg ttgaatggaa agaatataa atgcaaggtt      780
tcaaacaagg cactgccggc ccccatcgag aagactataa gcaaagccaa agggcaaccc    840
cgcgaaccac aagtctatac gctccctcca agtcgcgacg aacttaccaa aaaccaggtg     900
tcattgacct gtttggtgaa aggcttttat cccagcgaca tcgcggtgga atgggagtct     960
aacggtcaac tgagaataa ctacaagact actcctcctg tattggactc tgatggatct    1020
ttttttctct attccaaact gacagttgat aagtctaggt ggcagcaagg gaatgtcttt    1080
agttgtagcg tgatgcatga agcattgcat aaccactata ctcaaaagtc cctgagcttg    1140
tccccgggga agtga                                                    1155
```

<210> SEQ ID NO 12
<211> LENGTH: 384
<212> TYPE: PRT
<213> ORGANISM: Homo sapiens

<400> SEQUENCE: 12

Met Gly Trp Ser Cys Ile Ile Leu Phe Leu Val Ala Thr Ala Thr Gly
1               5                   10                  15

Val His Ser Glu Val Glu Lys Thr Ala Cys Pro Ser Gly Lys Lys Ala
            20                  25                  30

Arg Glu Ile Asp Glu Ser Leu Ile Phe Tyr Lys Lys Trp Glu Leu Glu
        35                  40                  45

Ala Cys Val Asp Ala Ala Leu Leu Ala Thr Gln Met Asp Arg Val Asn
    50                  55                  60

Ala Ile Pro Phe Thr Tyr Glu Gln Leu Asp Val Leu Lys His Lys Leu
65                  70                  75                  80

Asp Glu Leu Gly Gly Gly Gly Ser Glu Val Glu Lys Thr Ala Cys Pro
                85                  90                  95

Ser Gly Lys Lys Ala Arg Glu Ile Asp Glu Ser Leu Ile Phe Tyr Lys
            100                 105                 110

Lys Trp Glu Leu Glu Ala Cys Val Asp Ala Ala Leu Leu Ala Thr Gln
        115                 120                 125

```
Met Asp Arg Val Asn Ala Ile Pro Phe Thr Tyr Glu Gln Leu Asp Val
    130                 135                 140

Leu Lys His Lys Leu Asp Glu Leu Glu Pro Lys Ser Cys Asp Lys Thr
145                 150                 155                 160

His Thr Cys Pro Pro Cys Pro Ala Pro Glu Leu Leu Gly Gly Pro Ser
                165                 170                 175

Val Phe Leu Phe Pro Pro Lys Pro Lys Asp Thr Leu Met Ile Ser Arg
                180                 185                 190

Thr Pro Glu Val Thr Cys Val Val Val Asp Val Ser His Glu Asp Pro
            195                 200                 205

Glu Val Lys Phe Asn Trp Tyr Val Asp Gly Val Glu Val His Asn Ala
    210                 215                 220

Lys Thr Lys Pro Arg Glu Glu Gln Tyr Asn Ser Thr Tyr Arg Val Val
225                 230                 235                 240

Ser Val Leu Thr Val Leu His Gln Asp Trp Leu Asn Gly Lys Glu Tyr
                245                 250                 255

Lys Cys Lys Val Ser Asn Lys Ala Leu Pro Ala Pro Ile Glu Lys Thr
                260                 265                 270

Ile Ser Lys Ala Lys Gly Gln Pro Arg Glu Pro Gln Val Tyr Thr Leu
            275                 280                 285

Pro Pro Ser Arg Asp Glu Leu Thr Lys Asn Gln Val Ser Leu Thr Cys
    290                 295                 300

Leu Val Lys Gly Phe Tyr Pro Ser Asp Ile Ala Val Glu Trp Glu Ser
305                 310                 315                 320

Asn Gly Gln Pro Glu Asn Asn Tyr Lys Thr Thr Pro Pro Val Leu Asp
                325                 330                 335

Ser Asp Gly Ser Phe Phe Leu Tyr Ser Lys Leu Thr Val Asp Lys Ser
            340                 345                 350

Arg Trp Gln Gln Gly Asn Val Phe Ser Cys Ser Val Met His Glu Ala
    355                 360                 365

Leu His Asn His Tyr Thr Gln Lys Ser Leu Ser Leu Ser Pro Gly Lys
    370                 375                 380

<210> SEQ ID NO 13
<211> LENGTH: 1362
<212> TYPE: DNA
<213> ORGANISM: Homo sapiens

<400> SEQUENCE: 13
atggggtggt catgtatcat cttgtttctc gtggccaccg cgactggcgt gcattcagag      60
gtggagaaga ccgcctgtcc gagcgggaaa aaggctcgcg agattgatga gtcactgatt     120
ttctacaaaa agtgggaact cgaggcttgc gtagatgcag ctcttctggc tactcaaatg     180
gacagagtaa atgctattcc ttttacttat gaacaattgg acgtattgaa acacaagctg     240
gatgaattgg aggcggggg gtccgaggtc gagaagacgg cctgtccctc tggaaaaaaa     300
gcaagggaaa ttgacgagag tttgattttc tataagaaat gggagctcga agcatgtgta     360
gatgccgcac tgttggcaac tcaaatggat agggtgaacg caattccctt cacatatgaa     420
caactggatg tacttaagca taagttggac gaattgggag cggggggtc cgaggtcgag     480 aagacggcct gtccctctgg aaaaaaagca agggaaattg acgagagttt gattttctat     540
aagaaatggg agctcgaagc atgtgtagat gccgcactgt tggcaactca aatggatagg     600
gtgaacgcaa ttcccttcac atatgaacaa ctggatgtac ttaagcataa gttggacgaa     660
ttggaaccga atcttgtgca aaaacgcat acatgtccgc cgtgcccggc ccccgagctg     720
```

```
ctgggggtc ctagtgtctt tctctttcca cctaagccta aggatactct catgatctct    780
cgcacacccg aggtgacatg cgtagtcgtg gatgtcagcc acgaggatcc ggaagttaag    840
tttaactggt acgtcgacgg agttgaggta cacaatgcga aaacaaaacc acgcgaggaa    900
cagtataatt ccacgtaccg agtcgtttct gttcttacag tgttgcatca ggactggttg    960
aatggaaaag aatataaatg caaggtttca acaaggcac tgccggcccc catcgagaag    1020
actataagca agccaaagg gcaacccccgc gaaccacaag tctatacgct ccctccaagt    1080
cgcgacgaac ttaccaaaaa ccaggtgtca ttgacctgtt tggtgaaagg cttttatccc    1140
agcgacatcg cggtggaatg ggagtctaac ggtcaacctg agaataacta caagactact    1200
cctcctgtat tggactctga tggatctttt tttctctatt ccaaactgac agttgataag    1260
tctaggtggc agcaagggaa tgtctttagt tgtagcgtga tgcatgaagc attgcataac    1320
cactatactc aaaagtccct gagcttgtcc ccggggaagt ga                      1362
```

<210> SEQ ID NO 14
<211> LENGTH: 453
<212> TYPE: PRT
<213> ORGANISM: Homo sapiens

<400> SEQUENCE: 14

```
Met Gly Trp Ser Cys Ile Ile Leu Phe Leu Val Ala Thr Ala Thr Gly
1               5                   10                  15

Val His Ser Glu Val Glu Lys Thr Ala Cys Pro Ser Gly Lys Lys Ala
            20                  25                  30

Arg Glu Ile Asp Glu Ser Leu Ile Phe Tyr Lys Lys Trp Glu Leu Glu
        35                  40                  45

Ala Cys Val Asp Ala Ala Leu Leu Ala Thr Gln Met Asp Arg Val Asn
    50                  55                  60

Ala Ile Pro Phe Thr Tyr Glu Gln Leu Asp Val Leu Lys His Lys Leu
65                  70                  75                  80

Asp Glu Leu Gly Gly Gly Gly Ser Glu Val Glu Lys Thr Ala Cys Pro
                85                  90                  95

Ser Gly Lys Lys Ala Arg Glu Ile Asp Glu Ser Leu Ile Phe Tyr Lys
            100                 105                 110

Lys Trp Glu Leu Glu Ala Cys Val Asp Ala Ala Leu Leu Ala Thr Gln
        115                 120                 125

Met Asp Arg Val Asn Ala Ile Pro Phe Thr Tyr Glu Gln Leu Asp Val
    130                 135                 140

Leu Lys His Lys Leu Asp Glu Leu Gly Gly Gly Gly Ser Glu Val Glu
145                 150                 155                 160

Lys Thr Ala Cys Pro Ser Gly Lys Lys Ala Arg Glu Ile Asp Glu Ser
                165                 170                 175

Leu Ile Phe Tyr Lys Lys Trp Glu Leu Glu Ala Cys Val Asp Ala Ala
            180                 185                 190

Leu Leu Ala Thr Gln Met Asp Arg Val Asn Ala Ile Pro Phe Thr Tyr
        195                 200                 205

Glu Gln Leu Asp Val Leu Lys His Lys Leu Asp Glu Leu Glu Pro Lys
    210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255
```

```
Leu Met Ile Ser Arg Thr Pro Glu Val Thr Cys Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
        290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
                340                 345                 350

Gln Val Tyr Thr Leu Pro Pro Ser Arg Asp Glu Leu Thr Lys Asn Gln
            355                 360                 365

Val Ser Leu Thr Cys Leu Val Lys Gly Phe Tyr Pro Ser Asp Ile Ala
    370                 375                 380

Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
                420                 425                 430

Val Met His Glu Ala Leu His Asn His Tyr Thr Gln Lys Ser Leu Ser
            435                 440                 445

Leu Ser Pro Gly Lys
    450

<210> SEQ ID NO 15
<211> LENGTH: 5
<212> TYPE: PRT
<213> ORGANISM: Homo sapiens

<400> SEQUENCE: 15

Gly Gly Gly Gly Ser
1               5
```

COMPOSITION AND USE OF HUMORAL IMMUNE SUPPRESSOR ANTAGONISTS FOR THE TREATMENT OF HUMORAL IMMUNE SUPPRESSED DISEASES

TECHNICAL FIELD OF THE INVENTION

This invention relates to the area of humoral immunity and humoral immuno-oncology. In particular, it relates to methods, kits, and compositions of agents that can block and suppress the immuno-suppressive effects of the CA125/MUC16 protein to improve antibody-based therapeutic efficacy in inhibiting cancer growth and other humoral immuno-suppressed diseases.

BACKGROUND OF THE INVENTION

Humoral immunity is a major mechanism by which vertebrate host organisms surveil and defend against infectious pathogens and dysregulated host cells. In cancer biology, immune checkpoint inhibitors that overcome suppressed cellular-mediated immunity have demonstrated robust effects in unleashing activated CD8+ T-cell killing against subsets of tumors (Hodi F S, et al. N Engl J Med 363:711-723, 2010). Several commercially approved therapeutic antibodies have been reported to exhibit their pathogen- and/or tumor-killing effects through humoral-mediated antibody dependent cellular cytotoxicity (ADCC) and complement dependent cytotoxicity (CDC) (DiLillo D J, Ravetech J V, Cancer Immunol Res 3:704-713, 2015; Ruck T, et al. Int J Mol Sci. 16:16414-16439, 2015; Pelaia C, et al. Biomed Res Int 4839230:1-9, 2018). Recent translational findings have found that tumors utilize factors that can suppress humoral immune pathways that in turn suppress the tumor-killing effects by ADCC and CDC (Vergote I, et al. J Clin Oncol 34:2271-2278; Kline J B, et al. J Clin Oncol 5:15, 2018; Wang W et al. Cytogenet Genome Res 152:169-179, 2017; Kline J B et al. Eur J Immunol. 48:1872-1882, 2018). The antibody-mediated humoral immune response is governed by the coordination of antibody-cell surface antigen engagement that in turn positions the antibody on the antigen epitope at a certain proximity to the cell surface. In cases where this positioning is optimal, cell surface bound antibodies may engage with Fc-gamma activating receptors on Natural Killer (NK) or dendritic/myeloid/monocytic cells (herein any cell that participates in ADCC is referred to as an "immune-effector cell") to initiate ADCC as well as engage with the C1q complement initiating protein to cause death of antibody-bound cells via the classical complement CDC pathway (Reuschenbach M, et al. Cancer Immunol Immunother 58:1535-1544, 2009). These effects have been observed during the development of several therapeutic antibodies such as but not limited to rituximab, trastuzumab, cetuximab, alemtuzumab as well as a number of experimental antibodies (Zhou X, et al. Oncologist 13:954-966, 2008; Hsu Y F, et al. Mol Cancer 9:-8, 2010; Spiridon C I, et al. Clin Cancer Res 8:1720-1730, 2002; Kline J B, et al. Eur J Immunol 48:1872-1882, 2018). Similarly, humoral effects have been shown to occur within a patient's own immune response to dysregulated cells in response to vaccines and those with indolent disease yielding antibodies predominantly of the IgM class with anti-proliferative as well as immune-mediated killing activities (Staff C, et al. J Clin Immunol 32:855-865; Branden S, et al. Cancer Res 63:7995-8005, 2003). Yet, while many cancer patients have been found to produce autoantibodies to tumor-expressed antigens, their presence is not sufficient for controlling tumor growth likely due to overall antibody levels and/or humoral immuno-suppressive mechanisms.

Several reports have found that the tumor produced protein MUC16/CA125 may suppress humoral immune responses by directly binding to negative immune regulatory receptors of the SIGLEC family to suppress NK cell activation (Belisle J A, et al. Mol Cancer 9:1476-4598, 2010) as well as through direct binding to a subset of IgG1, IgG3 and IgM type antibodies that in turn perturb the Fc region making it less effective for IgG1 and IgG3 type antibodies to engage with Fc-gamma activating receptors FCGR2A (also referred to as CD32a) and FCGR3A (also referred to as CD16a) on immune-effector cells and/or for all three antibody classes to engage complement-mediating proteins, including C1q (Pantankar M S, et.al. Gyncol Oncol 99:704-713, 2005; Kline J B, et al. OncoTarget 8:52045-52060, 2017; Kline J B, et al. J. Clin. Oncol. 5:15, 2018; Wang W, et al. Cytogenet Genome Res 152:169-179, 2017; Kline J B, et al. Eur J Immunol. 48:1872-1882, 2018). These include clinical studies of anti-cancer antibodies that rely on immune-effector mechanisms for their pharmacologic activity in which serum CA125 levels have been found to correlate with clinical outcomes. These include reports on the experimental farletuzumab antibody in ovarian cancer and amatuximab antibody in mesothelioma (Vergote I, et al. J Clin Oncol 34:2271-2278, 2016; Nicolaides N C, et al. Cancer Biol Ther 13:1-22, 2018) and the commercially approved rituximab antibody in patients with Hodgkin's and Non-Hodgkin's Lymphoma. Patients with follicular lymphoma that where treated with rituximab plus CHOP (cyclophosphamide, doxorubicin (hydroxydaunomycin), vincristine (Oncovin®), and prednisolone) had a 31.4% improvement in 5-year PFS when CA125 levels were in the normal range (Prochazka V, et al. Int J Hematol 96:58-64, 2012) in contrast to those above the normal range that had a statistically significant worse clinical outcome. Based on these findings, there is a continuing need in the art to develop tools and agents that may overcome the humoral immuno-suppression mediated by CA125/MUC16 (referred to herein as CA125) and other proteins like it in cancer patients as well as other diseases in which humoral immuno-suppression is active by the presence of such proteins.

Recent publications have shown that mesothelin is a cell surface protein that is expressed by several tumor types and can bind to the CA125 protein. Both mesothelin and CA125 have been found to be membrane-bound as well as in soluble form. Their interaction can occur either as two soluble factors, two membrane-bound factors thus mediating heterotypic cell adhesion, and/or as a membrane-bound form that can interact with the other protein's soluble form (Rump A, et al. J Biol Chem 279:9190-9198, 2004; Hassan R, et al. Cancer Immunol 7:20-30, 2007; Kaneko O, et al. J Biol Chem 284:3739-3749, 2009; Hassan R. Lung Cancer 68:455-459, 2010). The CA125 binding domain within the mesothelin protein has been mapped to the amino acid region 296-359 and shown to be sufficient for binding to membrane-bound CA125 when fused to IgG Fc heavy chain (called HN125) or to domains of other proteins such as the death receptor binding domain of the TRAIL protein (called Meso64-TR3) (Xiang X, et al. J Cancer 2:280-291, 2011; Su Y, et al. OncoTarget 7:31534-31549, 2016).

SUMMARY OF THE INVENTION

One aspect of the invention is a fusion protein comprising at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDa if a multimer.

Another aspect of the invention is a nucleic acid vector encoding a MCB domain fusion protein. The fusion protein comprises at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDa if a multimer.

Another aspect of the invention is a stable cell line encoding a MCB domain fusion protein. The fusion protein comprises at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDa if a multimer.

Another aspect of the invention is a method to treat a patient with a disease who expresses an elevated level of CA125 compared to a population of healthy humans. A MCB domain fusion protein is administered to the patient. The fusion protein comprises at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDa if a multimer. A conjugate or protein comprising a plurality of MCB domains may alternatively be used.

Another aspect of the invention is a method to treat a patient with a disease who expresses an elevated level of CA125 compared to a population of healthy humans. An antibody is administered to the patient. The antibody (a) targets a tumor and (b) humoral immune responses mediated by the antibody are suppressed by CA125 in the absence of the MCB domain fusion protein. A MCB domain fusion protein is also administered to the patient. The fusion protein comprises at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDa if a multimer. A conjugate or protein comprising a plurality of MCB domains may alternatively be used.

Another aspect of the invention is a method for monitoring a tumor expressing CA125 in a patient. A body fluid sample from the patient is contacted with a MCB domain fusion protein. The fusion protein comprises at least two copies of a minimal CA125 binding (MCB) domain of mesothelin as shown in SEQ ID NO: 1. The MCB domain comprises amino acids 296 to 359 of mesothelin. The fusion protein further comprises an anchor protein. The fusion protein and/or the anchor protein is at least 60 kDa if a monomer or at least 30 kDA if a multimer. CA125 bound by the fusion protein is then detected. A conjugate or protein comprising a plurality of MCB domains may alternatively be used.

Another aspect of the invention is a conjugate comprising a polypeptide comprising at least two copies of a minimal CA125 binding (MCB) domain as shown in SEQ ID NO: 1 of mesothelin. The MCB domain comprises amino acids 296 to 359 of mesothelin. The polypeptide consists of at least two MCB domain copies that are attached to an anchor polymer, wherein the conjugate and/or the anchor polymer is at least 60 kDa. The conjugate may be used for treatment or monitoring, as discussed above with respect to the fusion protein.

Still another aspect of the invention is a polypeptide comprising at least two copies of a minimal CA125 binding (MCB) domain of mesothelin as shown in SEQ ID NO: 1. The MCB domain comprises amino acids 296 to 359 of mesothelin. The polypeptide contains at least two MCB domain copies and is associated to a liposome. The polypeptide may be used for treatment or monitoring, as discussed above with respect to the fusion protein.

In one aspect, a mesothelin-Fc fusion protein composition comprises a fusion protein containing two or more mesothelin-CA125 binding domains. The mesothelin binding domains consist of at least the minimal CA125 binding (MCB) domain of mesothelin (SEQ ID: 1). Two or more such domains may be bound together via genetic fusion or chemical ligation either in tandem or random or other configuration.

In another aspect of the invention, the fusion protein composition consists of two MCB domains (MCB domain-2X) genetically linked to the N-terminus of the human Fc IgG1 heavy chain (SEQ ID: 2). The two MCB domains may be linked together by an amino acid spacer.

In another aspect of the invention, the spacer linking the two MCB domains is optimized for (a) fusion protein binding to CA125 and/or (b) decreased immuno-suppression of antibody-mediated humoral responses.

In yet another aspect of the invention, a fusion protein composition consists of three or more MCB domains genetically linked to the N-terminus of the human Fc IgG1 heavy chain (SEQ ID: 3), using optimal amino acid spacers for maximizing CA125 binding.

Another aspect of the invention is a kit provided for characterizing a MCB domain fusion protein for its ability to block the immuno-suppressive activity of the CA125 protein. The kit comprises a fusion protein consisting of two or more MCB domain binding domains and an anchor protein or scaffold (such as, but not limited to a polymer or liposome) comprised of a protein of at least 60 kDa in molecular size if a monomer or at least 30 kDa in size if a multimer and/or nanoparticles (herein, all referred to as a "fusion protein") which is tested in vitro using any method used by those skilled in the art to determine if the fusion protein can remove the CA125 binding to an affected IgG1, IgG3 or IgM antibody (referred herein as "test antibody") and subsequent optimal suppression of engagement with Fc-gamma receptors CD16a or CD32a and/or C1q complement protein or remove the suppressed activation of NK cells by CA125 binding to SIGLEC receptors and/or direct binding to test antibody.

In another aspect of the invention, the kit is used to assay for the ability of the MCB domain fusion protein to remove the humoral inhibitory effect of CA125 on a test antibody using biological assays to measure antibody dependent cellular cytotoxicity (ADCC) or complement dependent cytotoxicity (CDC) via any one of the methods used by those skilled in the art.

In yet another aspect of the invention, the kit is used to assay for the ability of the MCB domain fusion protein to remove the internalization inhibitory effect of CA125 on test antibody, wherein the test antibody is labeled and monitored for internalization in a CA125 expressing cell in the presence or absence of the MCB domain fusion protein using methods commonly used by those skilled in the art of measuring antibody internalization. The use of antibody drug conjugates (ADC) can also be employed to test the ability of the MCB domain fusion protein to monitor internalization, wherein methods to measure cell viability as a function of ADC internalization and target cell killing are employed via any method commonly used by those skilled in the art. ADC is defined herein as an antibody bound directly or indirectly to a cytotoxic agent, wherein the cytotoxic agent is an immunotoxin, a chemical or chemo toxin, an RNA inhibitor or a radionuclide.

Another aspect of the invention is the use of a fusion protein containing two or more MCB domains in which a patient expressing CA125 is administered the fusion protein as a single agent or in combination with a CA125 inhibited therapeutic antibody with or without standard-of-care chemotherapy for the cancer indication. CA125 expression is determined using serum analysis or biopsy via methods used by those skilled in the art.

In yet another aspect of the invention, a fusion protein containing two or more MCB domains is administered to a patient expressing CA125 in combination with an ADC with or without standard-of-care. CA125 expression is determined using serum analysis or biopsy via methods used by those skilled in the art.

In another aspect of the invention, a fusion protein containing two or more MCB domains is administered to a patient with a non-oncologic indication in combination with a CA125 inhibited therapeutic antibody with or without standard-of-care therapy. CA125 expression is determined using serum analysis or biopsy via methods used by those skilled in the art.

And yet another aspect of the invention is the use of a fusion protein containing two or more MCB domains, whereby the fusion protein is labelled with any detector agent known by those skilled in the art to detect CA125 positive tumors either by biopsy or in situ within a patient.

These and other aspects of the invention which will be apparent to those skilled in the art upon reading the specification provide the art with methods, compositions, and kits for use in improving antibody-mediated humoral immune responses as well as therapeutic responses of ADCs in CA125 expressing diseases, including cancer as well as non-oncologic diseases that utilize antibody therapeutics whose mechanism of action include humoral-mediated immune responses.

BRIEF DESCRIPTION OF THE DRAWINGS

FIGS. 3A-3B. Monitoring of MCB Fc IgG1 fusion proteins containing one (MCB-1X) or two (MCB-2X) MCB domains on CD16a (FIG. 3A) or C1q (FIG. 3B) binding to rituximab test antibody. ELISA plates were coated with 5 μg/mL rituximab and probed with biotinylated human CD16a Fc-gamma receptor (FIG. 3A) or C1q (FIG. 3sB) in the presence or absence of 30 KU/mL CA125 with or without 2.5 μg/mL MCB domain-1X or MCB domain-2X fusion protein. Plates were washed and secondarily probed with streptavidin-HRP. Wells were quantified using a multi-well Varioskan plate reader at 450 nm. As shown, CA125 significantly suppressed the binding of CD16a-biotin as well as C1q-biotin to test antibody. This effect was significantly diminished by addition of MCB domain-2X fusion protein (SEQ ID NO: 2) and to a lesser extent by MCB domain-1X fusion protein (SEQ ID NO: 4). Experiments represent a minimum of triplicate wells.

(FIG. 4A) For CDC assays, 96-black well tissue culture plates were seeded with 25,000 cells/well of CD20-positive Daudi cells (derived from a patient with Burkitt's lymphoma) in 75 μLs of RPMI plus 1% heat inactivated fetal bovine serum (FBS), 1 μg/mL rituximab (RTX), and 1.3% rabbit complement with or without 30 KU/mL CA125. In addition, wells were given PBS, 20 μg/mL of one MCB domain (MCB domain-1X) or two MCB domain (MCB domain-2X) domain Fc fusion proteins. Plates were incubated for 1.5 hours at 37° C. in 5% $CO_2$ then quantified for viable cells via Cell-Titer Glo® (Promega) luminescence using a multi-well Varioskan luminescent plate reader. As shown, CA125 significantly suppressed the CDC killing of rituximab on Daudi cells. A similar effect was observed on Chinese Hamster Ovary (CHO) cells stably transduced to express the human CD20 antigen. Interestingly and unexpectedly, this suppression was significantly removed by the MCB domain-2X fusion protein but not by the MCB domain-1X fusion protein in both cell lines. Data are represented as a % improved CDC killing by dividing the effect of each RTX/MCB domain Fc fusion+/−CA125 treatment as compared to RTX+/−treatment. Experiments represent a minimum of triplicate wells. (FIG. 4B) For ADCC assays, 5,000 OVCAR3 cells/well were seeded in at least duplicate wells in 96-black well tissue culture plates in 55 μLs of RPMI complete media (2 mM L-glutamine and 1% ultra-low Ig FBS serum) and grown overnight at 37° C. in 5% $CO_2$. The next day, wells were given 300 ng/mL of NAV-007, a humanized IgG1 antibody targeting a cell surface OVCAR3 antigen, with PBS or 6 µg/mL of MCB domain-1X or MCB domain-2X Fc fusion proteins plus 75,000 Jurkat-CD16a-luc ADCC reporter cells (Effector:Target cell ratio of 15:1) and plates were incubated for 16 hours at 37° C. in 5% $CO_2$. ADCC activity was monitored via Bio-Glo™ luminescence following the manufacturer's instruction (Promega) using a multi-well Varioskan luminescent plate reader. Percent increase in ADCC activity by antibody plus MBC fusion protein vs antibody alone was calculated as [(MCB domain+NAV-$007_{value}$−NAV-$007_{value}$)/NAV-$007_{value}$]×100%. As shown, both MCB domain Fc fusion proteins were able to increase ADCC activity with the MCB domain-2X Fc fusion having a significantly more robust suppression of CA125 inhibition (70%, P=0.018) than the MCB domain-1X Fc fusion (7%, P=0.040), findings that were similar to the CDC data in panel A.

FIG. 8 shows relevant sequences used.

DETAILED DESCRIPTION OF THE INVENTION

Figure 1:
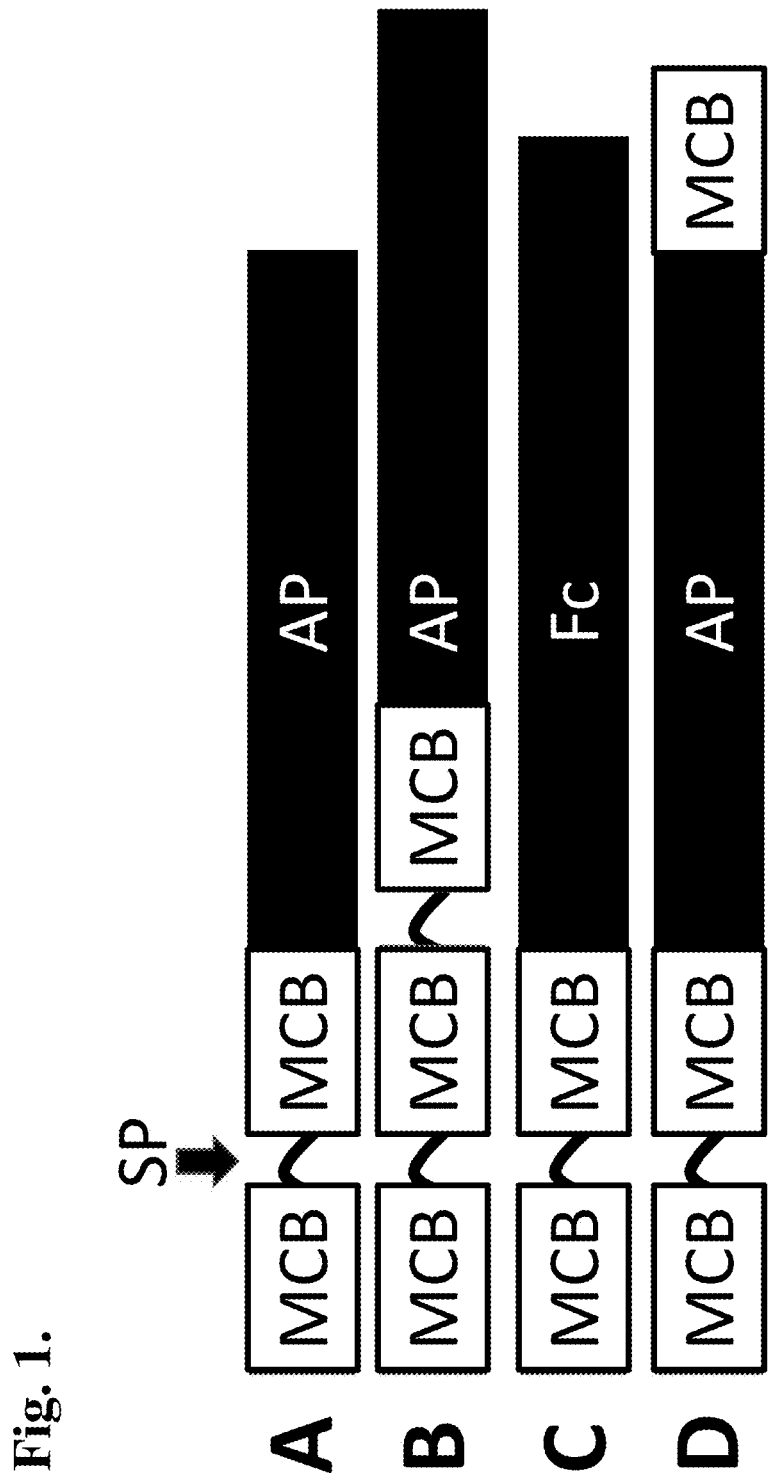
FIG. 1. Schematic diagram of fusion protein containing two MCB domain (MCB domain-2X) domains (fusion protein A); containing three or more MCB domains (fusion protein B); a fusion protein containing two MCB domain (MCB domain-2X) domains genetically linked in tandem via an amino acid spacer to the human Fc IgG1 heavy chain containing its disulfide bridge moiety (SEQ ID NO: 2) (fusion protein C); and a fusion protein containing at least two MCB domain linked in a non-tandem structure to an anchor protein (fusion protein D). AP represents an Anchor Protein linking MCB domains; MCB domain (SEQ ID NO: 1) represents a portion of mesothelin that contains at least the minimal CA125 binding domain; Fc represents the human Fc domain of the IgG1 heavy chain including its disulfide bridge moiety; SP represents an amino acid spacer linking MCB domains to each other.
Figure 2B:
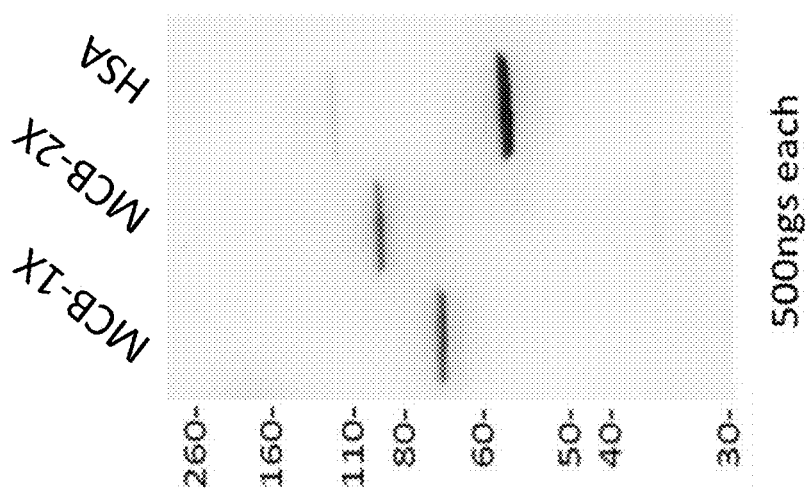
FIGS. 2A-2B. Monitoring the binding of Fc IgG1 heavy chain fusion proteins containing one versus two or more MCB domains (SEQ ID NO: 1) fused to the N-terminus of the CA125 protein via ELISA (FIG. 2A). Briefly, 96-well ELISA plates were coated with 15 KU/mL of soluble CA125 or human serum albumin (HSA) as a negative control and tested for CA125 binding by probing with 2.5 μg/mL of fusion protein containing one (MCB domain-1X) (SEQ ID NO: 4) or two (MCB domain-2X) MCB domains (SEQ ID NO: 2). Wells were next washed and monitored for binding via a secondary anti-human Fc-HRP conjugated detector antibody. Well signals were quantified using a multi-well plate reader (VarioSkan, ThermoFisher) at 450 nm. As shown, the fusion protein containing two MCB domain (MCB domain-2X) domains bound CA125 in a more robust fashion than the MCB domain-1X fusion protein. Experiments represent a minimum of triplicate wells. The accompanying stained gel (FIG. 2B) demonstrates that similar amounts of pure input sample were used for each fusion protein. Human serum albumin (HSA) is used as an irrelevant protein to quantify non-specific background binding.
Figure 2A:
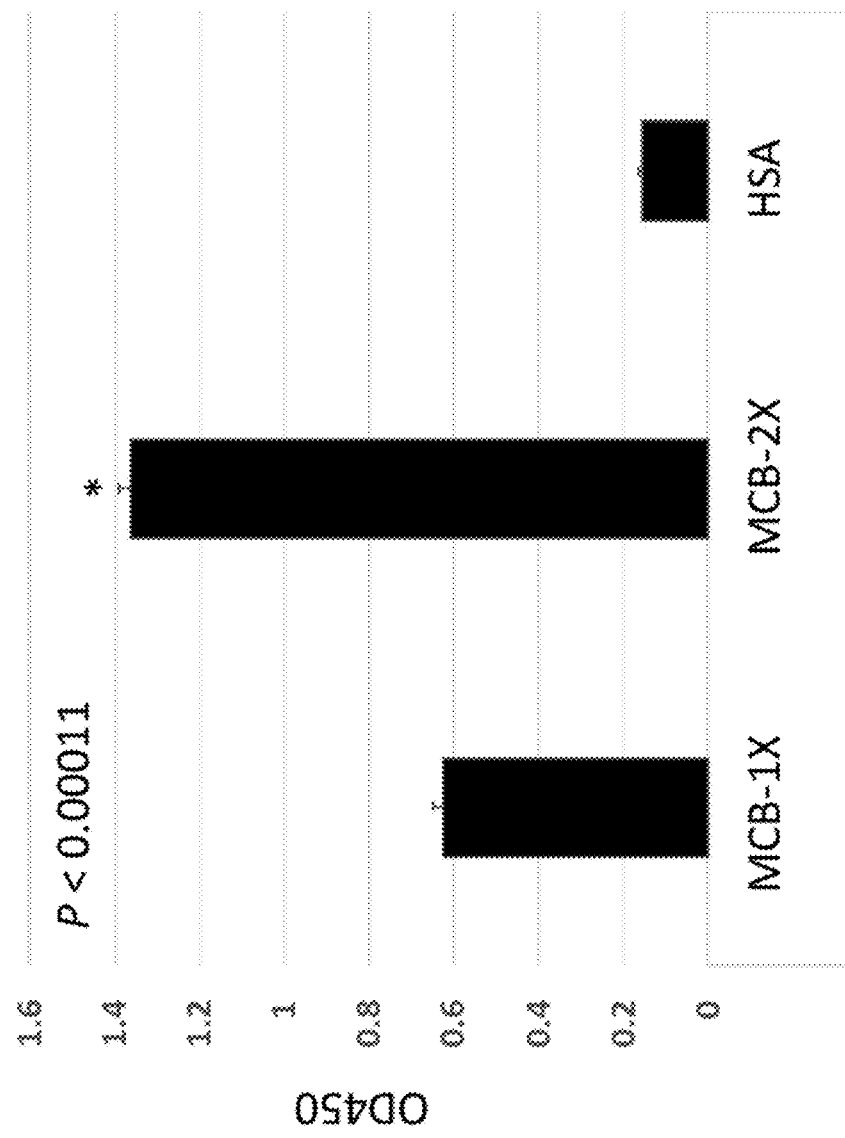
Figure 4A:
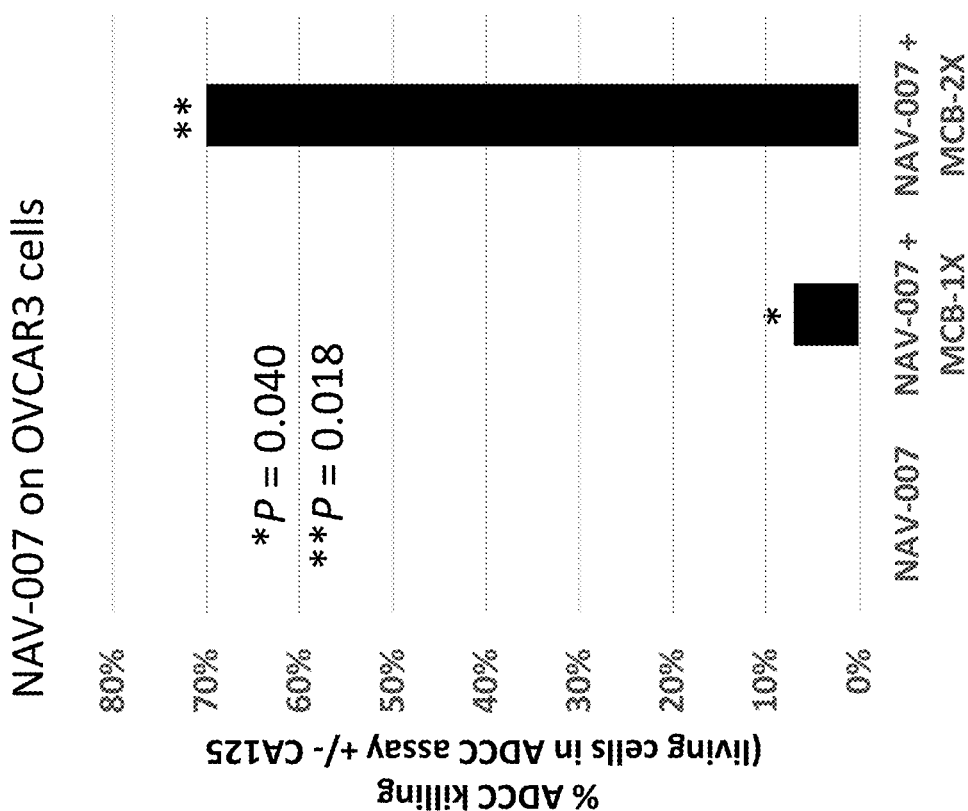
FIGS. 4A-4B. Monitoring of MCB Fc fusion proteins containing one (MCB-1X) or two (MCB-2X) MCB domains in overcoming CA125 suppression on CDC of rituximab (RTX) on Daudi cells (FIG. 4A) or ADCC of NAV-007 on OVCAR3 cells (FIG. 4B). MCB domain fusion proteins can significantly decrease CA125 suppression of C1q-mediated CDC and ADCC killing of affected test antibodies.
Figure 4B:
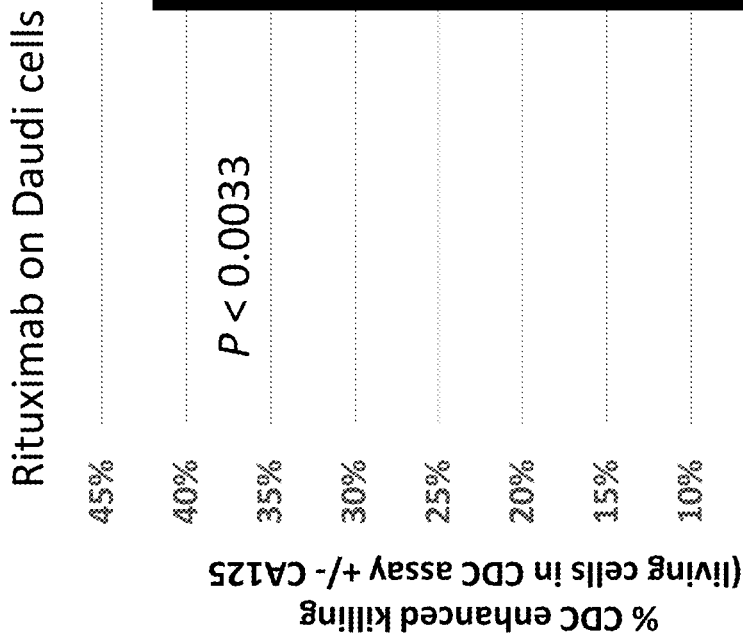
Figure 5:
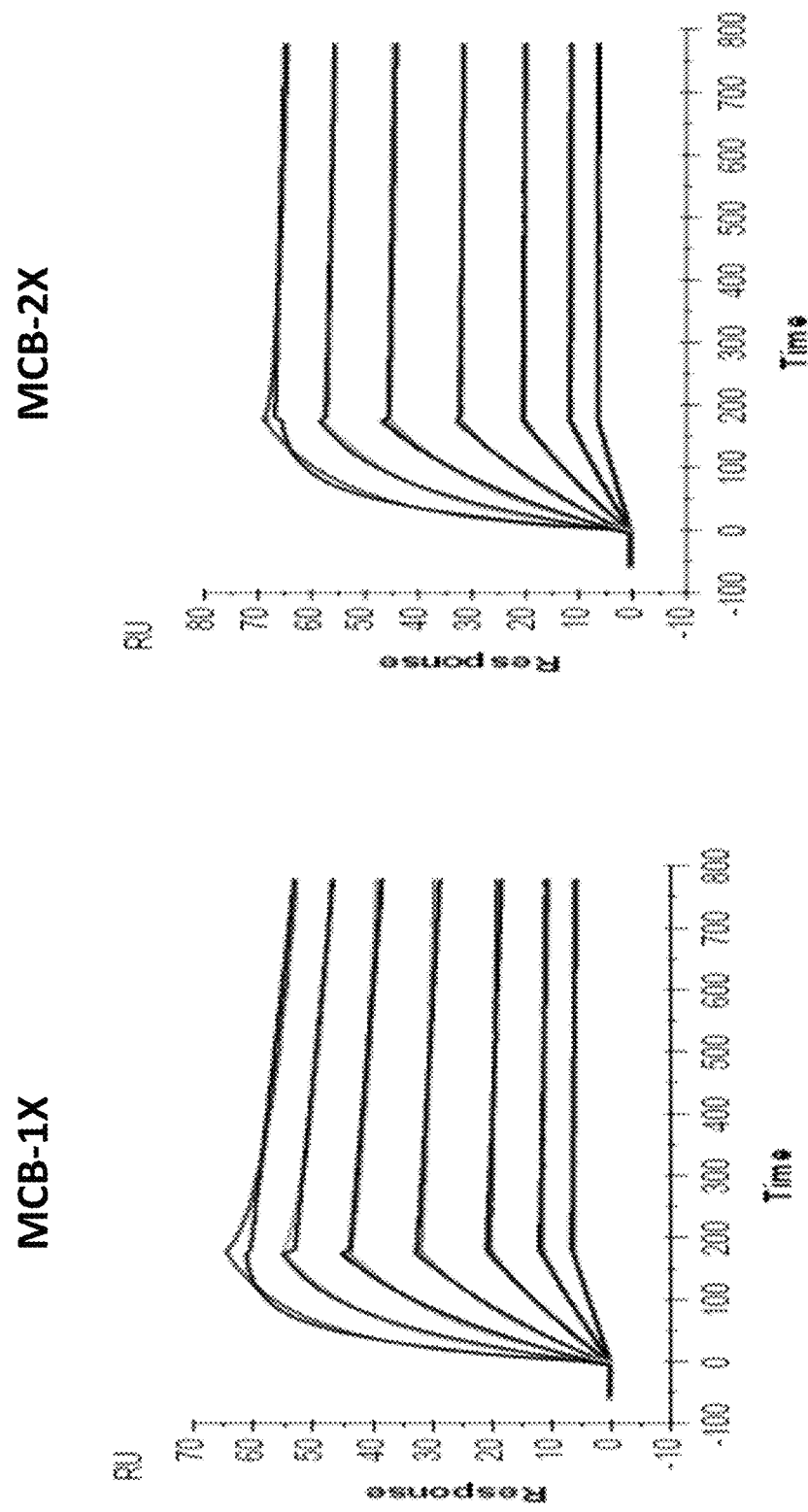
FIG. 5. Monitoring binding affinity of MCB Fc IgG1 fusion proteins containing one (MCB-1X) or two (MCB-2X) MCB domains to CA125. Multiple MCB domains increase the binding affinity of fusion proteins to CA125. MCB domain-1X (SEQ ID: 4) and MCB domain-2X (SEQ ID: 2) fusion proteins were captured on a Series S Sensor Chip Protein A (GE Healthcare). A his-tagged C-terminal fragment from CA125 was serially diluted and injected over the surface of flow cell 1, 2, 3 and 4 to monitor association, followed by injection of running buffer (10 mM HEPES, 150 mM NaCl, 3 mM EDTA and 0.05% Tween-20, pH7.4 to monitor dissociation. Flow cell 1 and buffer injection were used as double reference for Response Units subtraction. Data were processed and binding affinities (in molar units (M)) were determined using the BiaCore T200 Evaluation software version 3.1. As shown, the MCB domain-2X protein demonstrated a higher binding affinity KD=$1.49 \times 10^{-11}$ M than the MCB domain-1X fusion protein KD=$6.52 \times 10^{-11}$ M.

A protein consisting of a CA125 targeting protein is effective in abolishing the immuno-suppressive effect(s) that CA125 has on IgG1, IgG3, and IgM type antibodies. For example, a mesothelin-human IgG1 Fc heavy chain fusion protein can target CA125 expressing cells as well as soluble CA125, and importantly, can be used to block CA125's humoral immuno-suppressive activities. Moreover, such a fusion protein can be used to treat CA125-expressing cancers as a single agent that can unlock the humoral immuno-suppressive effects on autoantibodies produced by the patient's own immune system or in combination with exogenously administered therapeutic immunoglobulin-based proteins that are negatively affected by CA125 directly or indirectly.

We have developed therapeutic agents capable of overcoming humoral immuno-suppression by the CA125 protein and for improving CA125-affected antibodies for treating cancers as well as other CA125 immuno-suppressed diseases. While not wanting to be limited to any particular theory or mechanism of action, applicants believe that the CA125 protein engages with certain antibodies as well as SIGLEC receptors on NK cells and suppresses the antibody-mediated humoral immune response mediated by immune-effector cells and/or complement. These disruptions include suppression of the protein-antibody C1q-Ab (classical antibody-complement) complex and/or Fc-gamma activating receptor binding to antibody on immune-effector cells, such as but not limited to NK cells, resulting in the downstream inhibition of CDC and ADCC, respectively, as well as suppression of immune-effector cell activation upon Ab Fc-gamma activating receptor engagement via SIGLEC (sialic acid binding Ig-like lectin) receptors and/or suppression of alternative complement pathway recognition protein binding. In addition, the applicants believe that CA125 can suppress the internalization of affected antibodies and block the ability to deliver cytotoxic agents internally to kill target cells using antibody drug conjugates.

The methods and kits described here may be used to monitor and confirm the effectiveness of fusion proteins containing two or more MCB domains to overcome humoral immuno-suppression. Those fusion proteins that are capable of removing the inhibitory effect(s) of CA125 on humoral immune responses including ADCC and/or CDC on a test antibody are suitable for preclinical and human testing.

Some of the methods, compositions, and kits may be divided into two categories. In one category, a fusion protein containing two or more MCB domains is tested using different fusion partners (referred to as "anchor protein") as well as spacers to determine maximal effectiveness in overcoming CA125 suppression on ADCC and/or CDC as measured using molecular assays that monitor the binding of the Fc-gamma activating receptors CD16a or CD32a or C1q complement protein to test antibody in the presence of CA125. In another category, the fusion protein contains two or more MCB domains fused to the anchor protein human IgG1 Fc heavy chain (SEQ ID: 2) and is tested in combination with test antibodies to determine maximal effectiveness in overcoming CA125 suppression on ADCC and/or CDC as determined using cell viability assays. Test antibody can be added to antigen-positive target cells expressing CA125 or exogenously added CA125 to non-expressing cells with the fusion protein and measured for ADCC activity by addition of immune-effector cells (NK, dendritic/myeloid/monocytic cells, peripheral blood mononuclear cells or ADCC reporter cell lines); or human or rabbit complement to monitor CDC activity. In either assay, cell viability is compared between cells treated with or without the fusion protein to determine if the fusion significantly blocks CA125 humoral immune response of test antibody. CA125 can be produced from target cells or added exogenously to the cell culture. Cell viability is determined employing a variety of methods used by those skilled in the art.

In other embodiments, a fusion protein containing two or more MCB domains is tested using different anchor proteins as well as different spacers to determine maximal effectiveness in overcoming CA125 suppression on test antibody internalization. Internalization can be determined by using labeled test antibodies in the presence of positive-antigen expressing cells with CA125 and fusion proteins. CA125 can be produced by target cell or added exogenously to the cell culture. Internalization can be determined via labeled test antibody uptake by cells, and monitored by employing a variety of methods used by those skilled in the art. Alternatively, internalization can be monitored using an ADC wherein the toxic agent becomes cytotoxic upon liberation of the antibody by cellular enzymes. The ADC can be administered to antigen-positive cells expressing CA125, which are treated with or without the fusion protein, and cell viability can be monitored by employing a variety of methods used by those skilled in the art.

Test antibodies include but are not limited to anti-cancer antibodies that can be patient-derived antibodies that are collected from a patient to be treated, collected from a different patient, or made in the laboratory by other recombinant DNA or cellular means. Patient antibodies may be modified by various means prior to use. Certain commercial or experimental anti-cancer antibodies that may be tested using the methods of the invention include but are not limited to rituximab, trastuzumab, trastuzumab emtansine, cetuximab, YP218, oerelizumab, daratumumab, elotuzumab, emtuzumab, necitumumab, pertuzumab, obinutuzumab, nivolumab, ipilimumab, pembrolizumab, ofatumumab, panitumumab, ibritumomab tiuxetan, sacituzumab govitecan, brentuximab vedotin and tositumomab. Those antibodies that have improved humoral immune function (ADCC or CDC) and/or improved internalization are candidates for combination therapy using the optimal fusion protein and the affected test antibody.

For therapeutic applications, the MCB domain fusion proteins can be administered as monotherapy in combination with standard-of-care therapy and/or in combination with an affected test antibody.

Compositions can be formed in the course of conducting the methods. They may be pre-formed and packaged and provided to an entity that has an anchor protein fusion library to screen or one that can employ varying linkers to link MCB domains at varying lengths to each other or to anchor proteins, for example. Similarly, the components of the assays and methods described here may be packaged together in a container and sold as a kit. The components of a kit need not be, but may be mixed together. They can be provided in separate containers or in a divided container, for example. Any selection of antibodies, and the MCB domain fusion protein described here may be formed as a composition or kit.

While a few antibodies that are susceptible to CA125 immuno-suppression are known, the compositions described here are useful for any antibody whose dynamic structure is altered leading to suppressed humoral immune and/or pharmacologic responses as in the case of ADC internalization or humoral immune response.

The "dynamic structure" of an antibody or protein is defined as the three-dimensional structures of an antibody at a given time point, wherein such time point coincides with the antibody's engagement with another protein or agent, and the structure of the antibody before this time point has changed into a different structure after this time point in response to the antibody's engagement with another protein or agent. Monitoring this change in the presence of MCB domain fusion proteins is a method taught within this application. The effect of a protein binding to an antibody and affecting its dynamic structure has been reported in the case of hapten binding to the CDR domains of antibodies that in turn allosterically alter their Fc domain, thereby reducing its engagement with Fc binding proteins including Fc receptors (Janda A, et al. Front Microbiol 7:22, 2016). Previous studies also have shown that the dynamic structure of the (FAB')$_2$ domain is affected when an antibody was bound to its antigen (Werner T C, et al. Proc Natl Acad Sci 69:795-799, 1972). Recently, Kline et al reported that while several humanized monoclonal IgG1-type antibodies have similar amino acid structure, there are profound differences in the ability of CA125 to bind them, suggesting either primary or secondary structure may dictate CA125-antibody binding (Kline J B et al. OncoTarget 8:52045-52060, 2017). In light of growing evidence that tumors utilize various pathways to avoid host immune defense and the fact that antibody-based approaches continue to be pursued against various cancer types as well as inflammatory and infectious diseases, it is important to identify agents and define methods that can overcome the humoral immuno-suppression of affected antibodies such as the case of MCB domain fusion proteins. These agents and methods in turn enable the selection of lead antibodies that may overcome the immune suppression by CA125 and be useful for patient screening.

For example, if a test antibody is found to be affected by CA125, one may prescreen patients to determine if their tumor or disease expresses CA125. For those patients that do, one can use the optimized MCB domain fusion protein agent that can overcome CA125's inhibitory effect on humoral responses or ADC uptake. In this case, the agent could be the MCB domain fusion protein composed of two or more MCB domains linked by a spacer and fused to an anchor protein. Alternately, one can use a peptide with at least two MCB domains that are associated to a polymer of at least 60 kDa, to form a conjugate of at least 60 kDa, or associated to a liposome. In the case of the fusion protein, the anchor protein may be the Fc domain of the human IgG1 heavy chain containing its disulfide bridge. The anchor protein or chemical matrix will desirably be sufficient in molecular weight to avoid kidney excretion and short serum half-life. For proteins, the anchor protein or the fusion protein so formed, may be at least 60 kDa in molecular weight if a monomer or at least 30 kDa in molecular weight if the protein forms a multimer (a dimer or higher order structure).

Suitable anchor polymers include without limitation those which are safe and preferably biodegradable. These may be natural products or synthetic polymers. The most popular polymer at the present time for this purpose is polyethylene glycol, but others may be used, including, without limitation, dextran, hyaluronic acid, polysialic acid, hydroxyethylstarch, and poly(2-ethyl 2-oxazoline). Connecting a polymer to the MCB domains may be done by chemical conjugation, genetic fusion or enzymatic action. Cleavable linkers may be used, if desired.

Any liposome formulation for delivery of proteins and peptides may be used to deliver the two or more MCB domains to a patient. Conventional liposomes consist of a lipid bilayer composed of cationic, anionic, or neutral (phospho)lipids and cholesterol, which encloses an aqueous volume. Suitable compositions of liposomes include without limitation, the guanidinium-cholesterol cationic lipid bis(guanidinium)-tren-cholesterol (BGTC) combined with the colipid dioleoyl phosphatidylethanolamine (DOPE). Another example of a suitable liposome formulation is the aminoglycoside lipid dioleyl succinyl paromomycin (DOSP) associated with the imidazole-based helper lipid MM27. Liposomes can be sterically stabilized, using, for example, polyethylene glycol to coat a liposome. Liposomes can be ligand-targeted, if desired. Suitable ligands include antibodies, peptides, carbohydrates, and proteins.

We provide compositions, kits and methods for screening an antibody's dynamic structure in the presence of CA125 that can affect antibody dynamic structure and suppress its downstream immune-effector function(s) and/or cellular internalization upon binding to its cell surface target antigen. The methods include a step of composing and employing an Fc fusion anchor protein containing two or more MCB domains that can bind to CA125 bound to tumor cell membrane and/or as a soluble factor and block its inhibitory effect on an affected test antibody. The fusion protein (or agent) may comprise two or more MCB domains fused to the N- or C-terminus of an immunoglobulin Fc heavy chain domain or to a full length immunoglobulin where MCB domains are fused to the N-terminus of the light or heavy chain. Agents can also include fusion of two or more MCB domains to other anchor proteins such as but not limited to human albumin, TNF receptors, TGF receptors, cytokine receptors and/or nanobeads. Fusion proteins may also comprise two or more MCB domains linked to a label-modified anchor protein for detecting binding to membrane-bound CA125 for diagnosis of CA125-positive tumors as well as delivery of cytotoxic agents such as radionuclides and small molecule cytotoxic agents that can localize to extracellular membrane though interaction with CA125 and deliver cytotoxic payloads. FIG. 1 provides a schematic example but not limited to the types of fusion proteins that may be created and their composition containing two or more MCB domains linked to an anchor protein such as immunoglobulin Fc heavy chain domain. In some embodiments, fusion proteins contain two MCB domains fused to the N-terminus of the human IgG1 Fc heavy chain domain. In other embodiments, agents contain three MCB domains fused to the N-terminus of the human IgG1 Fc heavy chain domain. Yet in other embodiments, fusion proteins contain four or more MCB domains fused to the N-terminus of the human IgG1 Fc domain. Yet in other embodiments two or more MCB domains are fused to an anchor protein other than the human IgG1 Fc heavy chain domain, whereby the fusion can be at the N- or C-terminal domain or both domains simultaneously.

In some embodiments, the fusion protein or agent comprises two or more MCB domains fused to another protein (referred to as anchor protein) that is at least 60 kDa in molecular size as a monomer or 30 kDa in size if it forms dimers or multimers of higher magnitude to provide sufficient molecular weight to avoid urine excretion and short pharmacokinetic half-life from a treated subject (Farguhar M. Kideny Int 8:197-211, 1975). The fusion protein or agent is tested for the ability of affected test antibody to overcome CA125 humoral immune suppression on ADCC or CDC. In some embodiments the fusion protein is at least 60 kDa if a monomer or at least 30 kDa if a dimer or multimer.

In yet other embodiments, two or more MCB domains are attached in tandem to the anchor protein at the N- or C-terminus either in tandem or random. One or more MCB domains may be attached to the N- and C-terminus of the anchor protein using genetic fusion or chemical linkage, for example.

Another embodiment has MCB domains linked in tandem using an amino acid linker unit comprised of the amino acids GGGGS. The linker is comprised of one or more linker units. As an example but not wanting to be limited to, the MCB domain can be linked to one (GGGGS), two (GGGGSGGGGS), three (GGGGSGGGGSGGGGS) or more $(GGGS)_x$ where linker optimization is determined by optimal binding to CA125 of the fusion protein or effect on humoral immune response of affected test antibody in the presence of CA125 using any method used by those skilled in the art to measure ADCC, CDC or antibody internalization as described herein.

In yet another embodiment, linker unit consists of any combination of the known natural or modified amino acids and any length that may genetically link two or more MCB domains to an anchor protein that can be empirically tested for reducing antibody-mediated humoral immuno-suppression and/or internalization of an affected test antibody.

In one method for measuring the ability of a MCB domain fusion protein to be effective in overcoming CA125 humoral immuno-suppression and the dynamic state of an antibody; the agent is tested for direct binding and liberation of affected antibody's ability to bind CD16a or C1q proteins via ELISA or other methods known to those skilled in the art.

In some embodiments, functional methods are used to measure the effect of MCB domain fusion protein on overcoming humoral immune suppression by CA125 on affected test antibody using ADCC, CDC or internalization assays.

The term "effect" generally refers to a 10% or greater change in ADCC, CDC or ADC target cell killing when agent is incubated with test antibody alone as compared to antibody with CA125. It may, depending on the antibody and the agent used also refer to a change of at least 5%, 15%, 20%, 25%, 30%, 35%, 40%, 45%, 50%, 55%, 60%, 70%, or 75%.

Yet another embodiment comprises methods for screening antibody drug conjugates (ADCs) that may be affected by CA125 that may alter their pharmacokinetic (PK), pharmacodynamic (PD) or pharmacologic (PL) activity, including cellular internalization. In some embodiments, the ADC is added to cells and effect is tested for target cell killing in the presence or absence of the MCB domain fusion protein agent. Affected ADCs that have enhanced killing in the presence of the agent are now suitable for therapeutic testing. Again, the term effect may, depending on the antibody and the agent used refer to a change of at least 5%, 10%, 15%, 20%, 25%, 30%, 35%, 40%, 45%, 50%, 55%, 60%, 70%, or 75%.

Various terms and terminology ("terms") relating to aspects of the enclosed description are used throughout the specification and claims of this document. Such terms are to be given their ordinary meaning in the art unless otherwise specifically indicated. Other specifically defined terms are to be construed in a manner consistent with the definitions provided.

As used in this specification and the appended claims, the singular forms of "a," "an," and "the" also include plural references unless the content clearly specifically dictates otherwise. As example, reference to "a cell" may include a combination of two or more cells, and the like. Reference to "a probe" may include test antibody, an MCB domain fusion protein or an independent probe to monitor humoral immune response via any analytical method known by those skilled in the art.

The term "about" as used when referring to quantified values such as an amount, a period of time, and/or the like, is meant to encompass variations of up to ±9% from the specified value, as such variations are appropriate to carry out the disclosed methods. Unless otherwise indicated, all values expressing quantities of reagents, such as molecular weight, molarity, reaction conditions, percentage and so forth used in the specification and claims are to be understood as being quantified in all instances by the term "about." Accordingly, unless indicated to the contrary, the numerical values as set forth in the following specifications and listed claims are approximations that may vary depending upon the desired properties of the composition agent and/or methods sought to be obtained by the present invention. At the very least, and not as an attempt to limit the scope of the application, each numerical value should at least be valued by the reported significant digits and through ordinary rounding methods known by those skilled in the art.

The term "antibody" as used is meant in a broad sense and includes immunoglobulin (also referenced as "Ig") or antibody molecules including polyclonal antibodies (also referenced as pAbs), monoclonal antibodies (also referenced as mAbs) including murine, human, humanized and chimerized mAbs, bispecific antibodies (also referenced as BSP), antibody drug conjugates (also referenced as ADCs), antibody fused imunotoxins and antibody fragments. In general, antibodies are proteins or polypeptide chains that bind to a specific antigen. An antigen is a structure that is specifically recognized by a given antibody. Canonical antibodies comprise heterotetramer glycosylated proteins, composed of two light chains and two heavy chains lined through a complex of disulfide and hydrogen bonds. The term "its disulfide bridge" refers to the disulfide bridge contained within the heavy chain hinge region, which is commonly known by those skilled in the art. Each heavy chain has a variable domain (variable region) (VH) followed by a number of constant domains (referred to as the Fc domain). Each light chain has a variable domain (VL) and a constant domain; the constant domain of the light chain is aligned with the first constant domain of the heavy chain and the light chain VL is aligned with the variable domain of the heavy chain. Antibody light chains of any species are assigned to one of two distinct types based on their amino acid sequences within their constant domains, namely kappa (κ) and lambda (λ).

Immunoglobulins are categorized as classes or isotypes, depending upon the type of Fc domain namely IgA, IgD, IgE, IgG and IgM, which depend on the sequences contained within their heavy chain constant domain. The IgA and IgG isotypes are further comprised of subclasses as the isotypes $IgA_1$, $IgA_2$, $IgG_1$, $IgG_2$, $IgG_3$ and $IgG_4$.

An immunoglobulin VL or VH region consists of a "framework" region interrupted by three "antigen-binding sites" also referred to as Complementarity Determining Regions (CDRs) based on sequence variability as reported (Wu T T, Kabat E A. J Exp Med 132:211-250, 1970). In general, an antigen-binding site is composed of six CDRs with three located within the VH (CDRH1, CDRH2, CDRH3), and three within the VL (CDRL1, CDRL2, CDRL3) (Kabat E A, et al. $5^{th}$ Ed. PHS, National Institutes of Health, Bethesda, Md., 1991).

"Specific binding" or "specifically binds" refers to the binding of an antibody or antigen-binding fragment to an antigen (including sequences contained within an antibody itself) with greater affinity than for other antigens. Typically, a specific antibody or antigen-binding fragment binds target antigen with an equilibrium dissociation constant $K_D$ of about $5 \times 10^{-8}$ M or less.

An "antibody derivative" means an antibody, as defined above, that is modified by covalent attachment of another molecule such via peptide chemistry (i.e., amidation, etc.), genetic fusion and/or via post translational moieties (i.e., glycosyl, acetyl and/or phosphoryl) not typically associated with the antibody, and the like.

The term "antibody dynamic structure" refers to any change in structure that can affect antibody humoral function or internalization.

The term "monoclonal antibody (mAb)" refers to an antibody that is derived from a single cell clone, including any eukaryotic or prokaryotic cell clone, or a phage clone, and not the method by which it is produced. Thus, the term "monoclonal antibody" is not limited to antibodies produced through hybridoma technology but may also include recombinant methods.

"Fab domain" refers to any antibody sequence N-terminal to the antibody hinge disulfide region which is known by those skilled in the art.

"Fc domain" refers to any antibody sequence C-terminal to and including the antibody hinge disulfide region which is known by those skilled in the art.

"Anchor protein" refers to any protein to which MCB domains can be fused through genetic linkage or chemical ligation. The anchor protein and/or the genetically linked fusion protein or a conjugate has a molecular weight equal or greater than 60 kDa if it only forms a monomer and equal or greater than 30 kDa if it forms a multimer (a dimer, trimer, tetramer, or higher order structure). In some cases a non-peptide polymer may be used in place of an anchor protein. In such cases a conjugate is formed.

"MCB domain" refers to the minimal binding domain (SEQ ID NO: 1) from the human mesothelin protein to which CA125/MUC16 binds but may include larger segments of the mesothelin protein, including the entire protein itself (GenBank: AAH03512.1) or altered amino acid sequences that may improve affinity binding. Two or more copies of the MCB domain in a protein may be adjacent, as in a tandem repeat, or may be in different locations within a polypeptide, e.g., one or more at the amino terminal end and one or more at the carboxy terminal end. A polypeptide that contains more than one MCB domain may be a monomer, for example. The number of MCB domains does not determine the higher order structure of the overall protein, i.e., whether it forms a dimer, trimer, tetramer, etc.

An "antigen" is an entity to which an antibody or antibody fragment specifically binds. This includes binding to an antibody or protein of interest.

The term "test antibody" refers to an antibody which is tested for CA125 humoral immune suppression that the MCB domain fusion protein can be tested to overcome CA125 immuno-suppression via molecular or biological functional assays.

The term "CA125" refers to the gene product produced by MUC16 gene (HGNC: 15582; OMIM: 606154), which is found in soluble and membrane-bound forms. It has been reported to bind to antibodies and affect bound antibody humoral immune function (Kline J B, et al. Oncotarget 8:52045-52060, 2017).

The terms "cancer," "malignant," and "tumor" are well known in the art and refer to the presence of cells with unregulated cell growth and morphological features different than a normal cell type of similar origin, also referred to as dysregulated cells. Malignant refers to those cancer cells capable of causing morbidity and/or mortality. As used, "cancer and tumor" includes premalignant and malignant types.

As used, the term "soluble" refers to a protein or non-protein agent that is not attached to the cellular membrane of a cell. For example, an agent that is soluble may be shed, secreted or exported from normal or cancerous cells into biological fluids including serum, whole blood, plasma, urine or microfluids of a cell, including tumors.

The term "labelled," with regard to a MCB domain fusion protein (also referred to as a "probe"), is intended to encompass direct labeling of the probe by coupling (i.e., physically linking) a detectable substance to the probe (such as but not limited to a fluor, enzyme, radionuclide, etc.), as well as by indirect labeling of the probe by reactivity with another reagent that is directly labeled. An example of indirect labeling includes detection of a primary probe via a secondary fluorescently labeled probe that may include an antibody or aptamer that is specific to the probe. In one embodiment, the primary or secondary probe is labeled via radionuclides, chromophores, fluorophores, or enzymes. In another embodiment, the probe or secondary probe is an antibody derivative, an antibody fragment, a protein scaffold capable of target specific binding or an aptamer that is labelled with a protein ligand (e.g., biotin, the ligand for avidin and streptavidin). In yet another embodiment, the probe is used to detect CA125 positive cells in vitro or in situ.

The term "detector agent" or "detectable agent" refers to any agent that can be linked to a MCB domain fusion protein, including but not limited to a protein binding agent and/or aptamers and detected via devices commonly used in the field. These include but are not limited to fluors, enzymes and enzyme substrates, radionuclides, heavy metals and colorimetric dyes and substrates that can be detected via methods such as but not limited to densitometry, spectrophotometry, luminescence, microscopy, radiography and scintillation. Additional reagents may be needed to develop the detectable signal.

The "level" of a specified protein or non-protein agent including MCB domain fusion proteins and CA125, as used, refers to the level or levels of the agent as determined using any method known in the art for the measurement of protein and/or non-protein agent levels in vitro or in vivo. Such methods include gel electrophoresis, capillary electrophoresis, high performance liquid chromatography (HPLC), thin layer chromatography (TLC), hyperdiffusion chromatography, fluid or gel precipitation reactions, absorption spectroscopy, colorimetric assays, spectrophotometric assays, flow cytometry, immunodiffusion (single or double), solution phase assay, immunoelectrophoresis, Western blotting, radioimmunoassay (RIA), enzyme-linked immunosorbent assays (ELISAs), immunofluorescent assays, fluorescence resonance energy transfer (FRET), Förster resonance energy transfer, electrochemiluminescence immunoassay, and the like. In one embodiment, the level of CA125 is determined using probe-based techniques, as described in more detail. In another embodiment, the level of a MCB domain fusion protein is using probe-based techniques.

The term "humoral immuno-suppression or humoral immune suppression" refers to any antibody, antibody fragment, bispecific antibody (BSP) or antibody drug conjugate (ADC) that is directly bound by CA125 and whose dynamic structure is altered. It has been reported that CA125, which is produced by malignant cells such as ovarian carcinoma and mesothelioma (Nicolaides N C, et al. Cancer Biol Ther 19:622-630, 2018) as well as induced by lymphomas from normal surrounding epithelial cells (Sanusi et al. Pent Dial Int. 21:495-500, 2001), can bind certain antibodies and alter their dynamic structure thus affecting their biological activities including ADCC, CDC, opsinization, internalization and/or PK, PD and PL profiles.

The term "antibody drug conjugate (ADC)" refers to any antibody that is conjugated or fused to a chemical, polypeptide, nucleic acid or radionuclide that has toxic activity to cells.

The term "bispecific antibody (BSP)" refers to any antibody that can bind two or more different antigens. A BSP can comprise at least but not limited to two full length antibodies, a full length antibody and a single chain antibody, or two single chain antibodies, wherein each one binds to different antigens or different epitopes on the same antigen.

The term "antibody dependent cellular cytotoxicity (ADCC)" refers to an in vitro or in vivo process where an antibody can bind to an antigen on a surface of a cell then engage with immune-effector cells via sequences within the antibody's Fc domain that in turn results their release of toxins that can kill bound cell.

The term "complement dependent cytotoxicity (CDC)" refers to an in vitro or in vivo process where an antibody can bind to an antigen on a surface of an eukaryotic or prokaryotic cell then engage with the C1q protein via sequences within the antibody's Fc domain that in turn results in initiation of classical complement cascade that can kill bound cell.

The term "opsonization" refers to a process where an antibody can bind to an antigen on a surface of a cell then engage with immune cells via sequences within its Fc domain that in turn results in immune cells engulfing, consuming and ultimately killing antibody bound cell.

The term "internalization" refers to a process where an antibody, antibody fragment or
ADC can bind to an antigen on a surface of a cell then internalize via mechanisms known to those skilled in the art.

The term "pharmacokinetic (PK)" refers to the time that an antibody maintains its steady-state concentration when administered to a subject.

The term "pharmacodynamic (PD)" refers to the study of the biochemical and physiological effects of an antibody-based drug and its mechanisms of action(s), including the correlation of their actions and effects with their biochemical structure when administered to a subject.

The term "pharmacologic (PL)" refers to the known effect an antibody has on managing or killing a disease cell in vitro or in vivo.

The term "sample" refers to a collection of similar fluids, cells or tissues isolated from a subject, as well as fluids, cells or tissues present within a subject. Fluids may include biological fluids that include liquid solutions contacted with a subject or biological source, including cell and organoid culture medium, urine, salivary, lavage fluids and the like.

The term "control sample," as used, refers to any clinically or non-clinically relevant control sample, including, for example, a sample from a healthy subject not afflicted with a particular cancer type or a cell that is different from its parental cell.

The term "control level" refers to an accepted or predetermined level of a protein or non-protein agent that is used to compare with the level of the same agent in a sample derived from a subject or used in in vitro assays.

As used, "a difference" between signal of a test antibody in control vs being bound by CA125 in the presence or absence of a MCB domain fusion protein is generally any difference that can be statistically determined using statistical methods commonly used by those skilled in the art and at a minimum a difference of 10% or greater as compared to control. It may, depending on the antibody and the probes used also refer to a change of at least 5%, 15%, 20%, 25%, 30%, 35%, 40%, 45%, 50%, 55%, 60%, 70%, or 75%.

The term "inhibit" or "inhibition of" means to reduce by a statistically measurable amount, or to prevent entirely.

The term "functional," in the context of an antibody, antibody containing moiety (i.e. BSP, ADC, etc.) or MCB domain fusion protein to be used in accordance with the methods described, indicates that the antibody and/or fusion protein is capable of binding to antigen or CA125, respectively, and/or is able to bind to and kill target cells in vitro or in vivo.

The term "target cell" refers to a eukaryotic or prokaryotic cell or population of cells that expresses antigen for a specific antibody or antibody containing moiety.

The term "pharmaceutically acceptable" refers to a substance that is acceptable to administer to a patient from a pharmacological as well as toxicological aspect and is manufactured using approaches known by those skilled in the art. These include agents approved by a regulatory agency of the Federal or a state government or listed in the U.S. Pharmacopeia or other generally recognized pharmacopeia for use in animals and humans. The term "pharmaceutically compatible ingredient" refers to a pharmaceutically acceptable diluent, adjuvant, excipient or matrix vehicle with which an anti-cancer agent is administered. "Pharmaceutically acceptable carrier" refers to a matrix that does not interfere with the effectiveness of the biological activity of the active ingredient(s) and is nontoxic to the host.

The terms "effective amount" and "therapeutically effective" are used interchangeably and, in the context of administering a pharmaceutical agent at an amount that is sufficient to produce an enhanced clinical outcome in a patient. An effective amount of an agent is administered according to the methods described here in an "effective regimen." The term "effective regimen" refers to a combination of amount of the agent and dosage frequency adequate to accomplish an enhanced clinical outcome for a patient with a particular cancer. Enhanced efficacy is an improved clinical outcome when a patient is administered an agent that is capable of overcoming morbidity better than a parental compound or an agent that can enhance the clinical outcome of an effective regimen. As in context here, effective amount refers to the amount of MCB domain fusion protein required to demonstrate efficacy or a difference when compared to no MCB domain fusion protein.

The terms "patient" and "subject" are used interchangeably to refer to humans and other non-human animals, including veterinary subjects, that receive a therapeutic agent treatment. The term "non-human animal" includes all vertebrates. In one embodiment, the subject is a human.

"Therapeutic agents" are typically substantially free from undesired contaminants. This means that an agent is typically at least about 50% w/w (weight/weight) pure as well as substantially free from interfering proteins and contaminants.

The term "immune-effector cell" refers to any cell including but not limited to NK, myeloid, monocytes, dendritic cells that may confer antibody dependent cellular cytotoxicity (ADCC) or phagocytosis (opsonization) upon binding to antibody-bound target cell. Cells may be purified or present in mixture in the form of peripheral blood mononuclear cells (PBMCs).

The term "dysregulated cell" refers to any cell that is deemed abnormal to parental cells. These include transformed cells, malignant cells, virally infected cells, autonomously growing cells via autoregulation, or prokaryotic pathogens.

The term "humoral response" refers to ADCC, CDC or internalization of antibody into target cells by test antibody.

The term "agent" or "MCB domain fusion agent" or "MCB domain fusion protein" refers to any fusion protein containing two or more MCB domains either genetically linked or chemically ligated to an anchor protein. The fusion protein, conjugate, and/or anchor protein is 60 kDa or greater in molecular weight if the anchor protein is a monomer or 30 kDa or greater in molecular weight if the anchor protein forms multimers (dimers or structures with higher order magnitude).

The term "screening" may refer to testing of MCB domain fusion proteins that can bind to CA125 in the presence of a test antibody or antibody containing moiety (i.e., BSP, ADC, single chain antibody, antibody fragment, etc.) and looking for enhanced biological response monitoring ADCC, CDC or ADC killing. The term may be used in other contexts in which a large number of test elements is being assayed to determine which among the test elements has a certain property. Similarly, it can be used to refer to the assaying of patient samples for those having a particular property. Fusion proteins, proteins, or conjugates may be used for such screening.

The term "significant(ly)" refers to statistical results where the P value as determined by any number of programs including the Student's T-Test is less than 0.05.

Composition of Therapeutic Fusion Proteins, Kits and Methods for Overcoming CA125-Mediated Humoral Immune Suppression for Therapy Provided here are compositions of MCB domain fusion proteins (agents), kits and methods for identifying such agents that can effectively suppress CA125's suppression on humoral immune response by affected test antibodies. In some embodiments of the methods for identifying optimal MCB domain fusion proteins described here, the method involves generating MCB domain fusion proteins containing two or more MCB domains linked by an amino acid spacer and genetically fused to an anchor protein and testing for the ability of affected test antibody or ADC to have significantly improved biological activity when used to mediate ADCC, CDC, or toxin-induced killing against target cells. In some embodiments, the MCB domain fusion proteins consists of two MCB domains fused to the human IgG1 Fc heavy chain domain, wherein the heavy chain retains the disulfide bridge domain within the hinge region. In other embodiments, the MCB domain fusion protein consists of two or more MCB domains linked by an amino acid spacer and fused to an anchor protein derived from proteins other than immunoglobulin IgG1, wherein the anchor protein is 60 kDa or greater in molecular weight if a monomer or 30 kDA or greater if it forms a dimer or multimer of a higher order to avoid renal clearance and have extended PK half-lives. In other embodiments, the MCB domain fusion consists of at least two MCB domains linked by an amino acid spacer and is pegylated, conjugated to serum albumin, bound by antibody(ies), and/or modified via other modification to create a fusion molecule 60 kDa or greater in molecular weight. In yet other embodiments, the MCB domain fusion protein has three or more MCB domains linked by an amino acid spacer and fused to an anchor protein. Fusion can be through genetic fusion to the N- or C-terminus of the anchor protein and the configuration of MCB domain can be in tandem order or separated by linking at the N-terminus and the C-terminus of the anchor protein as exampled in FIG. 1D. Linkage between tandem MCB domains are through genetic linkers encoding the amino acid linker unit GGGGS. Linkage can be via one or multiple units. Optimal spacer units can be determined using functional ADCC, CDC or ADC killing assays in the presence of affected test antibody, CA125 and target cells. Examples are schematically shown in FIG. 1. Kits are composed of the MCB domain fusion protein that are able to significantly overcome humoral immuno-suppression by CA125 on affected test antibody by employing ADCC, CDC or ADC killing assay used by those skilled in the art.

In yet another embodiment, the fusion protein has a binding affinity greater than kDa=$6.5 \times 10^{-11}$M (65 pM). The binding affinity may be greater than 50 pM, 25 pM, or 10 pM, for example. The lower the dissociation constant, the higher the affinity.

In the methods for identifying active MCB domain fusion proteins, an affected test antibody is added to a culture of target cells in which target cells naturally or recombinantly express CA125. Cultures comparing humoral response of those with MCB domain fusion protein vs those without are monitored for humoral response using standard ADCC, CDC or ADC killing assays. A change in at least 10% is typically considered as being a meaningful effect on ADCC, CDC and/or ADC functions. Depending on the antibody and the assay employed, a meaningful effect also may be defined as a change of at least 5%, 15%, 20%, 25%, 30%, 35%, 40%, 45%, 50%, 55%, 60%, 70%, or 75%.

In the methods for identifying active MCB domain fusion proteins, an affected test antibody is added to a culture of target cells in which target cells naturally express CA125. Cultures comparing humoral response of those with MCB domain fusion protein vs those without are monitored for humoral response using standard ADCC, CDC or ADC killing assays. A change in at least 10% is typically considered as being a meaningful effect on ADCC, CDC and/or ADC functions. Depending on the antibody and the assay employed, a meaningful effect also may be defined as a change of at least 5%, 15%, 20%, 25%, 30%, 35%, 40%, 45%, 50%, 55%, 60%, 70%, or 75%.

Another method for identifying active MCB domain fusion proteins, measures the internalization of an affected test antibody in target cells that express CA125. An affected antibody may be labeled and added to target cells with or without MCB domain fusion protein to compare internalization. A change in at least 10% is typically considered as being a meaningful effect. Depending on the antibody and the assay employed, a meaningful effect also may be defined as a change of at least 5%, 15%, 20%, 25%, 30%, 35%, 40%, 45%, 50%, 55%, 60%, 70%, or 75%.

Also provided here are methods of treating a cancer subject with a MCB domain fusion protein. For example, a patient may have a mesothelin-expressing cancer such as mesothelioma, colorectal, lung, ovarian, pancreatic, cholangio, or endometrial carcinoma. Several anti-mesothelin antibodies have been reported to be bound by CA125 making the use of an effective MCB domain fusion protein a desirable entity. Another such antibody is the anti-CD20 rituximab, which has been found in clinical studies to have significantly suppressed therapeutic effect in patients with high levels of serum CA125. Rituximab has been found to be bound by CA125. The use of an effective MCB domain fusion protein for this antibody is also highly desirable.

In some embodiments of the methods of treating a subject with a MCB domain fusion protein, a patient with cancer that expresses CA125 may be treated with a MCB domain fusion protein alone or in combination with standard-of-care therapy. In some embodiments of the methods of treating a subject with CA125-expressing cancer described here, an MCB domain fusion protein is administered to the subject, where the subject has a baseline CA125 level that is above the normal range. In some embodiments of the methods of treating a subject with CA125-expressing cancer described here, the method involves administering the MCB domain fusion protein alone. In yet another embodiment, the MCB domain fusion protein is administered in combination with chemotherapy. The chemotherapy may be cisplatin, carboplatin and/or pemetrexed, or any other chemotherapeutic agents considered standard-of-care at the time when the subject is treated. In the methods of treatment described here, CA125 expression level may be determined by any means known in the art and defined as within or above the normal range by those skilled in the art.

In some embodiments of the methods of treatment described here, the MCB domain fusion protein consists of two MCB domains tandemly linked by an amino acid spacer and fused to the N-terminus of the human IgG1 Fc heavy chain anchor protein (SEQ ID NO: 2). The agent is administered to patients with CA125 expressing cancers. Exemplary cancers known to produce CA125 include but are not limited to mesothelioma, lymphoma, lung, colorectal, ovarian, endometrial, choliangio, and pancreatic cancers.

The present methods can be combined with other means of treatment such as surgery (e.g., debulking surgery), radiation, targeted therapy, chemotherapy, immunotherapy, use of growth factor inhibitors, or anti-angiogenesis factors. An MCB domain fusion protein can be administered concurrently to a patient undergoing surgery, chemotherapy or radiation therapy treatments. Alternatively, a patient can undergo surgery, chemotherapy or radiation therapy prior to or subsequent to administration of the MCB domain fusion protein by at least an hour and up to several months, for example at least an hour, five hours, 12 hours, a day, a week, a month, or three months, prior or subsequent to administration of standard of care therapy. Some embodiments of the methods of treatment provided here involve administration of a therapeutically effective amount of a platinum-based chemotherapy and/or a folate antimetabolite plus an antibody to a tumor-specific antigen to the subject in addition to the MCB domain fusion protein.

In some embodiments of the methods of treatment described here, the subject may have received first-line surgical resection of the tumor, first-line platinum-based therapy, first-line folate antimetabolite-based therapy, and/or first-line platinum and folate antimetabolite-based therapy for treatment of the cancer prior to administering an antibody specific to an antigen expressed by said cancer and MCB domain fusion protein.

Administration of the therapeutic agents (including the antibody therapeutic agent, the folate antimetabolite, and/or the platinum-based chemotherapy and MCB domain fusion protein) in accordance with the methods of treatment described here may be by any means known in the art.

In yet another embodiment, a therapeutic antibody may be used that comprises the CDR sequences that can direct binding of an antibody to the CD20 antigen: SEQ ID NO:5 (GYTFTSYN) as CDRH1, SEQ ID NO:6 (IYPGNGDT) as CDRH2, SEQ ID NO:7 (ARSTYYGGDWYFNV) as CDRH3, SEQ ID NO:8 (SSSVSY) as CDRL1, SEQ ID NO:9 (ATS) as CDRL2 and SEQ ID NO:10 (QQWTSNPPT) as CDRL3, numbered according to IMGT® (the international ImMunoGeneTics information system®). The antibody may be administered to CD20-expressing disease indication and where CA125 is above the normal range in a co-administration with an MCB domain fusion protein. Dose level of MCB domain fusion protein may be as high as the clinically determined maximal tolerated dose (MTD) or levels below the MTD. Administration of MCB domain fusion protein can be prior to, concomitant with or after administration of antibody. Treatment can include surgery as well as treatment with standard-of-care.

Various delivery systems can be used to administer the therapeutic agents (including the affected antibody agent, the folate antimetabolite, and/or the platinum-based chemotherapy, MCB domain fusion protein) including intradermal, intramuscular, intraperitoneal, intravenous, subcutaneous, intranasal, epidural, and oral routes as deemed necessary. The agents can be administered, for example by infusion or bolus injection, by absorption through epithelial or mucocutaneous linings (e.g., oral mucosa, rectal and intestinal mucosa, and the like) via systemic or local approaches.

The therapeutic agents can be administered by injection via syringe, catheter, suppository, or any implantable matrix or device.

The therapeutic agents and pharmaceutical compositions thereof for use as described here may be administered orally in any acceptable dosage form such as capsules, tablets, aqueous suspensions, solutions or the like.

Suitable methods of administration of the therapeutic agents include but are not limited to intravenous injection and intraperitoneal administration at a final concentration suitable for effective therapy.

The MCB domain fusion protein in combination with other drugs can be administered as pharmaceutical compositions comprising a therapeutically or prophylactically effective amount of the therapeutic agent(s) and one or more pharmaceutically acceptable or compatible ingredients.

The amount of the therapeutic agent that is effective in the treatment or prophylaxis of a cancer or non-oncologic disease can be determined by standard clinical techniques. In addition, in vitro assays may optionally be employed to help identify optimal dosage ranges required for the MCB domain fusion protein. Effective doses may be extrapolated from dose-response curves of MCB domain fusion protein derived from in vitro or animal model test systems.

For example, toxicity and therapeutic efficacy of the agents can be determined in cell cultures or experimental animals by standard pharmaceutical procedures for determining the $LD_{50}$ (the dose lethal to 50% of the population) and the $ED_{50}$ (the dose therapeutically effective in 50% of the population) values. The dose ratio between toxic and therapeutic effects is the therapeutic index and it can be expressed as the ratio $LD_{50}/ED_{50}$. Agents that exhibit large therapeutic indices are suitable. When an agent exhibits toxic side effects, a delivery system that targets the agent to the site of affected tissue can be used to minimize potential damage to non-mesothelin-expressing cells and, thereby, reduce side effects.

The dosing and dosage schedule may vary depending on the active drug concentration, which may depend on the needs of the subject.

Yet another embodiment labels a MCB domain fusion protein with a cytotoxic drug to specifically deliver the cytotoxin to the CA125-expressing target cell in patients expressing CA125.

Another embodiment labels a MCB domain fusion protein for detection of CA125 expressing cells for diagnostic applications to detect and/or monitor the status of a CA125 expressing cell in vitro or in situ Composition of Kits to Optimize Activity of MCB Domain Fusion Proteins Further provided here are kits for making MCB domain fusion proteins suitable for overcoming an affected antibody's humoral immuno-suppressed activity by CA125.

Kits may include a MCB domain fusion protein containing two MCB domains linked by an amino acid spacer and genetically attached to the N-terminus of the human IgG1 Fc heavy chain domain anchor protein and an affected antibody, wherein the antibody may include but not be limited to rituximab.

The above disclosure generally describes the present invention. All references disclosed here are expressly incorporated by reference. A more complete understanding can be obtained by reference to the following specific examples which are provided here for purposes of illustration only, and are not intended to limit the scope of the invention.

Example 1—Schematic Diagram of MCB Domain Fusion Proteins and Their Activity in Overcoming Humoral Immuno-Suppression of Affected Test Antibodies FIG. 1 shows a schematic diagram of a MCB domain fusion protein comprising: two MCB domains genetically linked by an amino acid spacer and genetically fused to an anchor protein (A); three or more MCB domains genetically linked by an amino acid spacer and fused to the N-terminal or C-terminal domains of an anchor protein (B); two MCB domains genetically linked by an amino acid spacer and genetically fused to the human IgG1 Fc heavy chain domain (C); and three or more MCB domains genetically linked by an amino acid spacer and fused to the N-terminal and the C-terminal domains of an anchor protein (D). The anchor protein consists of a protein 60 kDa or greater that exists as a monomer or a protein 30 kDa or greater that exists as a multimer (dimer or higher order structure) to maintain significant molecular weight size to avoid renal excretion ad short serum half-life. In the case of HSA, while linkage can be on the N- or C-terminus, it can also be linked to the internal free cysteine (in some references referred to as Cys34) that has been used to conjugate other molecules and used by those skilled in the art (Sugio S, et al. Protein Engineering 12:439-446, 1999). Alternatively chemical modifications such as but not limited to pegylation may be used with smaller anchor proteins or multimers of the MCB domain itself to create large molecular weight fusion proteins. Linked MCB domains shown here are attached via genetic linkage using the spacer unit GGGGC. The spacer units to be employed include the use of a single spacer unit and well as fusion proteins containing multiple spacer units.

Figure 6:
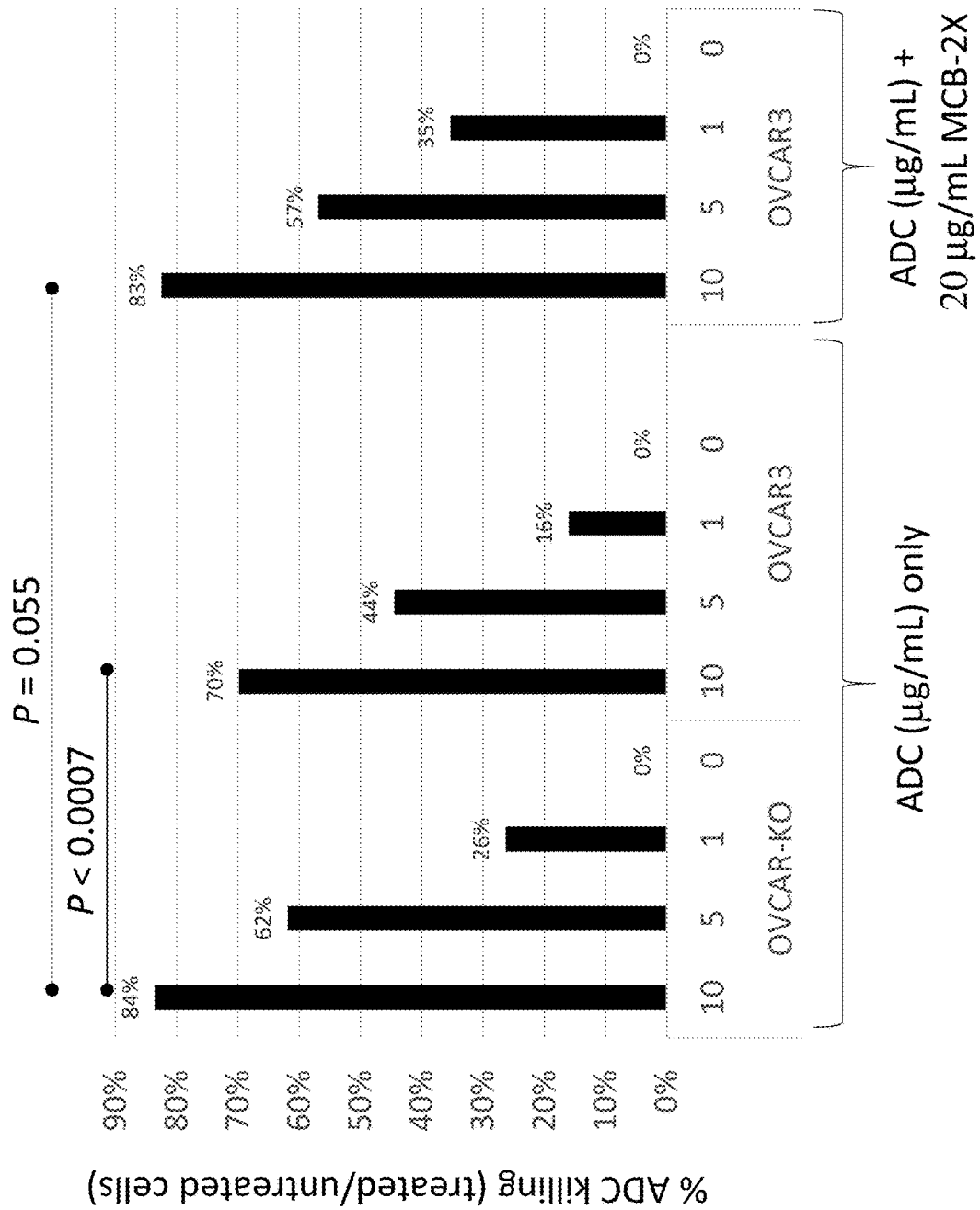
FIG. 6. Effect of MCB-2X fusion protein on enhanced ADC killing. CA125 negatively affects cytotoxicity of antibody drug conjugates (ADC) and MCB domain fusion protein can enhance the killing of ADCs targeting antigen-positive CA125-expressing tumor cells. Briefly, 96-well plates were seeded with 5,000 cells/well using the human ovarian cancer cell line OVCAR3 or its isogenic CA125 knocked down line OVCAR-KO in 100 µLs of RPMI complete growth media (7.5% heat inactivated FBS, 2 mM L-glutamine, 1% penicillin). The next day, wells were washed and a humanized anti-mesothelin IgG1 ADC was added at 0, 1, 5 and 10 µg/mL with or without 20 µg/mL of MCB domain-2X fusion protein (SEQ ID NO: 2) and cells were grown for 120 hours at 37° C. in 5% $CO_2$, then washed and stained using crystal violet. Dried stained wells were solubilized using 1% SDS in phosphate buffer saline (PBS) and quantified by colorimetric densitometry on a VarioSkan multi-well plate reader at 570 nm. Panel A shows that the ADC had as significant enhancement in killing of OVCAR-KO cells as compared to parental OVCAR3. Panel B shows that the MCB domain-2X fusion protein was able to significantly enhance cell killing when added to the ADC as compared to ADC alone. No cytotoxicity was observed by MCB domain-2X fusion protein alone suggesting that the significant enhanced killing came from a biological impact directly on the ADC. Data are presented as a percent of killing comparing cell growth of cultures with varying concentrations of ADC+/−MCB domain-2X fusion protein as compared to cultures with no ADC.

Here we provide examples of two MCB domain fusion proteins; one consisting of a single MCB domain (MCB domain-1X) linked to the N-terminus of the human Fc heavy chain (SEQ ID NO:4) and the other consisting of two MCB domain (MCB domain-2X) domains linked via a single spacer unit to the N-terminus of the human Fc heavy chain (SEQ ID NO:2) whereby the Fc anchor protein retains the disulfide bridge. For the generation of stable recombinant MCB domain fusion producing cell lines, the commercial pCMV-IRES-zeocin vector was used. cDNAs encoding MCB domain fusion proteins were synthetically synthesized and cloned downstream of the CMV promoter and upstream of IRES-zeocin resistant gene cassette. To generate stable recombinant fusion protein production cell lines, FreeStyle™ 293-F cells (Thermo Fisher Scientific) that are maintained in serum-free HEK293 BalanCD medium (Irvine Scientific) containing 4 mM glutamine, 100 U/mL of penicillin, and 100 μg/mL of streptomycin. were seeded in 4 mLs at $0.5\times10^{6}$/mL in a T25 vented cap flask. Cells were grown shaking at 130 RPM, in 70% humidity at 37° C. and 5% $CO_2$. The next day, transfection reactions were made by combining 0.2 mL of OptiPRO™ SFM (Thermo Fisher Scientific), 2 μg/each of plasmid DNA and 15 μL of polyethylenimine Max Mw 40,000 (Polysciences) and incubating for 30 minutes followed by addition to cells. Cultures were grown shaking at 130 RPM in 70% humidity and 37° C. and 5% $CO_2$ for 48 hours. Cells were then plated in 10 cm dishes containing 10 mL/each of RPMI 1640 (Caisson Labs) supplemented with 2 mM glutamine, 100 U/mL of penicillin, 100 μg/mL of streptomycin, 7.5% fetal bovine serum, and selected in 200 μg/mL zeocin (Thermo Fisher Scientific) for 10 days. Cells were next subcloned by limiting dilution and after 2 weeks, conditioned media were tested for recombinant MCB domain fusion protein production. Productive subclones were expanded and adapted in serum-free HEK293 BalanCD medium containing 4 mM glutamine, 100 U/mL of penicillin, 100 μg/mL of streptomycin, and 200 μg/mL zeocin. Adapted cultures were then expanded to 80 mLs and grown for 7 days at which time cultures were harvested and MCB domain fusion proteins purified using Protein A column affinity chromatography following dialysis in PBS buffer. Fusion proteins were then quantified, diluted to equal molar volumes and tested for the ability to overcome CA125 humoral immuno-suppression of affected test antibodies in a number of functional assays as described below.

While previous reports have shown the ability of a single MCB domain fused to an anchor protein to bind CA125, none have reported on the ability of a particular MCB domain fusion configuration to overcome humoral immunosuppression by CA125 on affected antibodies. As shown in FIG. 2, the MCB domain fusion protein containing two MCB domains (MCB domain-2X) domains bound CA125 better than the fusion protein containing only one MCB domain (MCB domain-1X). This effect was recapitulated in CD16a and C1q antibody binding ELISAs that showed the MCB domain-2X fusion protein was able to significantly enhance CD16a as well as C1q binding to affected test antibody in the presence of CA125 (FIG. 3). Moreover and unexpectedly, in functional assays only the MCB domain-2X fusion protein showed significantly enhanced humoral CDC (FIG. 4A) and ADCC (FIG. 4B.) activity when an affected antibody (rituximab for CDC assays and NAV-007, a humanized anti-glycoprotein antibody, for ADCC assays) was incubated with target cells and exogenously added soluble CA125 or target cells naturally expressing CA125 in the presence of the MCB domain-2X domain Fc fusion protein (SEQ ID NO:2) vs the MCB domain-1X domain Fc fusion protein (SEQ ID NO:4) (FIG. 4). In concordance with CA125 ELISA binding data, surface plasmon resonance (SPR) analysis via BiaCore found that the MCB domain-2X fusion protein had better binding affinity (KD=$1.49\times10^{-11}$ M) to CA125 than the MCB domain-1X (KD=$6.52\times10^{-11}$ M) which may provide an explanation of this unexpected finding (FIG. 5). Together these data teach of using fusion proteins that need to contain at least two MCB domains in order to sufficiently overcome the CA125 immuno-suppression on ADCC and CDC humoral immune response.

Example 2—MCB Domain Fusion Proteins with Two or More MCB Domains have Improved Internalization and Killing of CA125 Expressing Cells by Antibody Drug Conjugates (ADCS)

The use antibody drug conjugates (ADCs) have grown over the years with the successful commercialization of Adcetris® and Kadcyla® (Hedrich W D, et al. Clin Pharmacokinet 57:687-703, 2018). The major mechanism by which these ADCs work is to target the cancer cell's cell surface antigen with an antigen-specific antibody component which binds and then internalizes, wherein the cytotoxic payload is liberated from the antibody via internal proteolytic enzymes. The rate of internalization may have a severe impact on the efficacy of a given ADC (Chalouni C and Doll S. J Exp Clin Cancer Res 37:20-32, 2018). Here we teach that CA125 may have a significant impact on the efficacy of ADCs targeting cancer cells that produce CA125. FIG. 6 shows an example of how an ADC's cytotoxicity may be diminished when the treating tumor cells that express high levels of CA125. In these studies, an anti-mesothelin ADC containing the topoisomerase inhibitor SN38 was used against a human ovarian cancer cell line OVCAR3, which expresses mesothelin and CA125, and an engineered isogenic cell line where CA125 was knocked-down using shRNA (Sigma-Aldrich) (referred to as OVCAR-KO). A similar line was previously published and shown to have significantly enhanced antibody-mediated humoral response by CA125 affected antibodies in contrast to parental OVCAR cells (Kline J B, et al. OncoTarget 8:52045-52060, 2017; Nicolaides N C, et al. Cancer Biol Ther 13:1-22, 2018). As shown in FIG. 6 left side bars, an anti-mesothelin ADC was less effective at killing the OVCAR3 parental cell line as compared to the isogenic OVCAR-KO line. To determine the use of MCB domain fusion proteins to improve ADC killing of CA125 expressing tumor cells and CA125 affected antibodies, we plated OVCAR3 cells in a 96 well format and treated OVCAR3 parental cells with the anti-mesothelin ADC in the presence or absence of the MCB domain-2X fusion protein (SEQ ID NO: 2). As shown in FIG. 6 right side bars, the administration of the MCB domain-2X fusion protein with the ADC had a significantly enhanced ADC killing as compared to cells treated with ADC alone.

Figure 7:
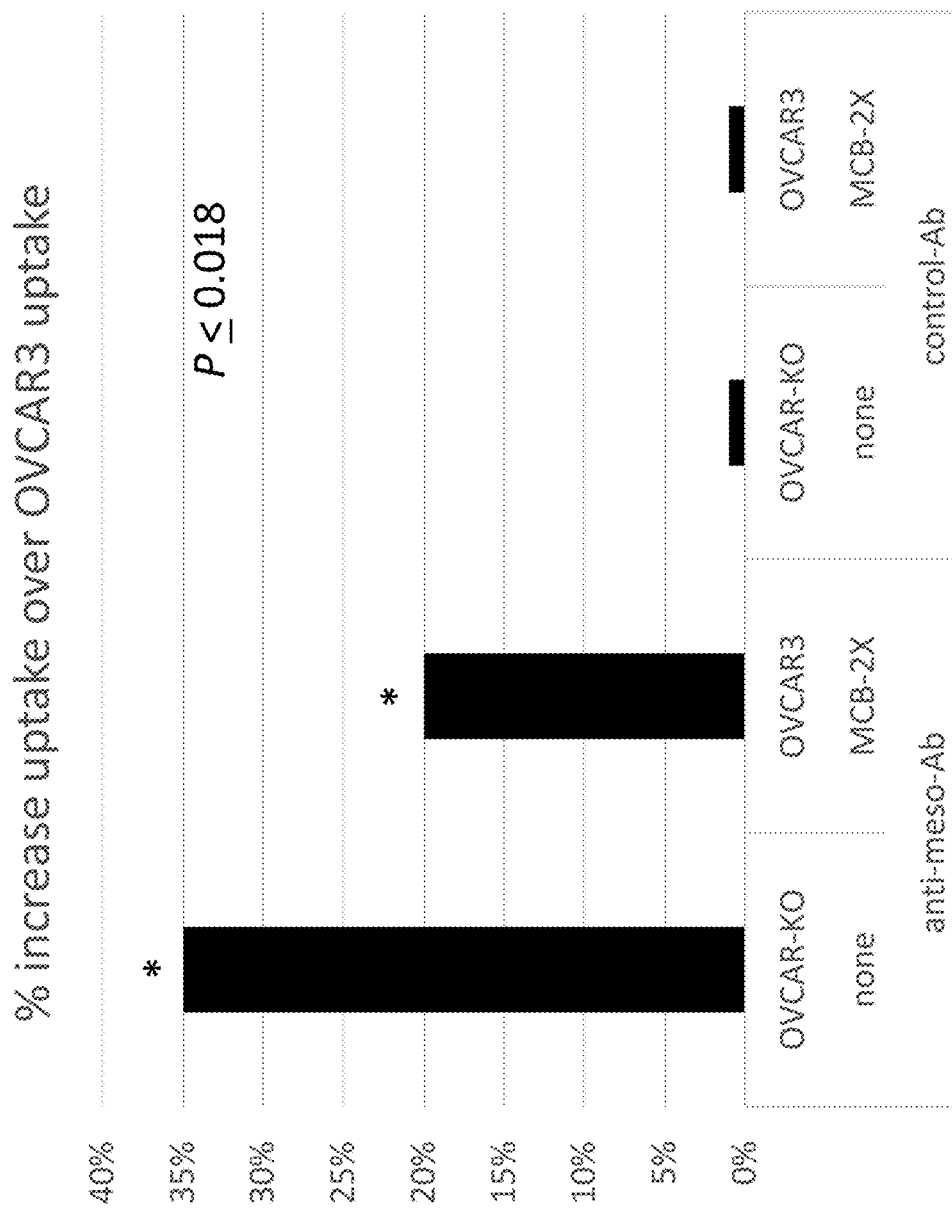
FIG. 7. Effect of MCB-2X Fc fusion protein on enhanced antibody internalization. The two MCB domain fusion protein (MCB domain-2X) can enhance antibody uptake in CA125 expressing cells. A humanized anti-mesothelin antibody and a negative control antibody (no antigen on target cells) were biotinylated and then bound to the pHrodo® red avidin agent (ThermoFisher), a fluorogenic pH sensor dye that dramatically increases in fluorescence as the pH of its surroundings become more acidic upon internalization into cellular endosomes, following the manufacturer's instructions. To test the ability of these antibodies to internalize alone or in the presence of the MCB domain-2X fusion protein, OVCAR3 and OVCAR-KO cells were plated and probed for antibody uptake. Briefly, 96-black well plates were seeded with 100,000 cells/well harvested using PBS/EDTA. Next, cells were pretreated with 20 µg/mL of MCB domain-2X fusion protein or PBS for 1 hour, then 2 µg/mL of the anti-mesothelin pHrodo antibody or a non-specific pHrodo antibody control were added to cells, incubated for 1 hour on ice, and then incubated for up to 1 hour at 37° C. in 5% $CO_2$. Plates were read on the multi-well Varioskan fluorometer at 590 nm. As shown, the OVCAR-KO cells had a more significant uptake of anti-mesothelin antibody than OVCAR3 parental cells. In addition, OVCAR3 cells had a more significant uptake when treated with the MCB domain-2X fusion protein in contrast to control. The nonspecific antibody showed no uptake in any cells. The values represent the average of at least triplicate wells.

As internalization is a critical factor for ADC cytotoxic activity, we employed the pHrodo® red avidin (ThermoFisher) fluorogenic pH sensor dye system that can monitor the uptake of antibodies into cells. Briefly, OVCAR3 and OVCAR-KO cells were incubated with an pHrodo-labeled anti-mesothelin antibody and a pHrodo-labeled nonspecific antibody, prepared following the manufacturer's instructions, and tested for uptake by OVCAR3 alone or in the presence of fusion protein containing two MCB domains (MCB domain-2X) (SEQ ID NO:2). As shown in FIG. 7, OVCAR-KO cells had a 35% greater uptake (P≤0.014) of anti-mesothelin antibody than parental OVCAR3 cells. When OVCAR3 cells were preincubated with MCB domain-2X fusion protein for 1 hour then tested for anti-mesothelin antibody uptake, cells had a 20% greater uptake (P≤0.018) than OVCAR3 cells without MCB domain-2X fusion protein treatment. A pHrodo-labeled control antibody (control-Ab) for which the OVCAR cells do not express its antigen showed little to no uptake. Together these data demonstrate that CA125 may impact the uptake and efficacy of ADC-based therapeutics and the use of MCB domain fusion proteins containing at least two MCB domains are sufficient for improving antibody uptake, enabling ADCs to have a greater cellular cytotoxicity on cells expressing CA125.

TABLE 1

SEQUENCE IDENTIFICATION
(all sequences N to C terminal)

SEQ ID NO: 1
EVEKTACPSGKKAREIDESLIFYKKWELEACVDAALLATQMDRVNA

IPFTYEQLDVLKHKLDEL

SEQ IN NO: 2
*MGWSCIILFLVATATGVHS*EVEKTACPSGKKAREIDESLIFYKKWE

LEACVDAALLATQMDRVNAIPFTYEQLDVLKHKLDEL<u>GGGGS</u>EVEK

TACPSGKKAREIDESLIFYKKWELEACVDAALLATQMDRVNAIPFT

YEQLDVLKHKLDELEPKSCDKTHT*CPPC*PAPELLGGPSVFLFPPKP

KDTLMISRTPEVTCVVVDVSHEDPEVKFNWYVDGVEVHNAKTKPRE

EQYNSTYRVVSVLTVLHQDWLNGKEYKCKVSNKALPAPIEKTISKA

KGQPREPQVYTLPPSRDELTKNQVSLTCLVKGFYPSDIAVEWESNG

QPENNYKTTPPVLDSDGSFFLYSKLTVDKSRWQQGNVFSCSVMHEA

LHNHYTQKSLSLSPGK

SEQ IN NO: 3
*MGWSCIILFLVATATGVHS*EVEKTACPSGKKAREIDESLIFYKKWE

LEACVDAALLATQMDRVNAIPFTYEQLDVLKHKLDEL<u>GGGGS</u>EVEK

TACPSGKKAREIDESLIFYKKWELEACVDAALLATQMDRVNAIPFT

YEQLDVLKHKLDEL<u>GGGGS</u>EVEKTACPSGKKAREIDESLIFYKKWE

LEACVDAALLATQMDRVNAIPFTYEQLDVLKHKLDELEPKSCDKTH

T*CPPC*PAPELLGGPSVFLFPPKPKDTLMISRTPEVTCVVVDVSHED

PEVKFNWYVDGVEVHNAKTKPREEQYNSTYRVVSVLTVLHQDWLNG

KEYKCKVSNKALPAPIEKTISKAKGQPREPQVYTLPPSRDELTKNQ

VSLTCLVKGFYPSDIAVEWESNGQPENNYKTTPPVLDSDGSFFLYS

KLTVDKSRWQQGNVFSCSVMHEALHNHYTQKSLSLSPGK

SEQ ID NO: 4
*MGWSCIILFLVATATGVHS*EVEKTACPSGKKAREIDESLIFYKKWE

LEACVDAALLATQMDRVNAIPFTYEQLDVLKHKLDELEPKSCDKTH

T*CPPC*PAPELLGGPSVFLFPPKPKDTLMISRTPEVTCVVVDVSHED

PEVKFNWYVDGVEVHNAKTKPREEQYNSTYRVVSVLTVLHQDWLNG

KEYKCKVSNKALPAPIEKTISKAKGQPREPQVYTLPPSRDELTKNQ

VSLTCLVKGFYPSDIAVEWESNGQPENNYKTTPPVLDSDGSFFLYS

KLTVDKSRWQQGNVFSCSVMHEALHNHYTQKSLSLSPGK

*Italics* denotes leader sequence
Bold face denotes MCB domain minimal domain
<u>Underline</u> denotes amino acid spacer
Normal font denotes human Fc heavy chain domain
<u>*Underline italics*</u> denotes disulfide bridge moiety in Fc domain

---

We claim:

1. A fusion protein comprising: (a) at least two copies of a minimal CA125 binding (MCB) domain of mesothelin comprising amino acids 296 to 359 of mesothelin as shown in SEQ ID NO:1,
wherein at least two copies of the MCB domains are joined by a spacer unit comprising one or more units of GGGGS (SEQ ID NO: 5) and (b) an anchor protein, wherein the fusion protein is a polypeptide and has a monomer molecular weight of at least 60 kDa if it exists as a monomer or has a monomer molecular weight of at least 30 kDa if it forms a multimer, thereby having a multimer molecular weight of at least 60 kDa, and wherein the anchor protein is a heavy chain of a human IgG1 isotype antibody.

2. The fusion protein of claim 1 wherein the at least two copies of the MCB domain are N-terminal to the anchor protein.

3. The fusion protein of claim 1 wherein the at least two copies of the MCB domain are C-terminal to the anchor protein.

4. A fusion protein comprising: (a) at least two copies of a minimal CA125 binding (MCB) domain of mesothelin comprising amino acids 296 to 359 of mesothelin as shown in SEQ ID NO:1,
wherein at least two copies of the MCB domains are joined by a spacer unit comprising one or more units of GGGGS (SEQ ID NO: 5) and (b) an anchor protein, wherein the fusion protein is a polypeptide and has a monomer molecular weight of at least 60 kDa if it exists as a monomer or has a monomer molecular weight of at least 30 kDa if it forms a multimer, thereby having a multimer molecular weight of at least 60 kDa, and wherein the anchor protein is a heavy chain of a human IgG3 isotype antibody.

5. The fusion protein of claim 1 wherein the heavy chain comprises a disulfide bridge.

6. The fusion protein of claim 1 wherein the anchor protein is joined to at least one copy of the MCB domain via a disulfide bridge.

7. The fusion protein of claim 1 wherein the sequence of the fusion protein is as shown in SEQ ID NO:2.

8. The fusion protein of claim 1 wherein the sequence of the fusion protein is as shown in SEQ ID NO:3.

9. The fusion protein of claim 1 wherein the fusion protein binds to CA125 with an affinity greater than KD=65 pM.

10. The fusion protein of claim 1 wherein the fusion protein binds to CA125 with an affinity greater than KD=50 pM.

11. The fusion protein of claim 1 wherein the fusion protein binds to CA125 with an affinity greater than KD=25 pM.

12. A nucleic acid vector encoding a fusion protein of claim 1.

13. A nucleic acid vector encoding a fusion protein of claim 4.

14. A nucleic acid vector encoding a fusion protein of claim 8.

15. A stable cell line encoding a fusion protein of claim 1.

16. A stable cell line encoding a fusion protein of claim 4.

17. A stable cell line encoding a fusion protein of claim 8.

* * * * *